US009244616B2

(12) United States Patent
Miwa et al.

(10) Patent No.: US 9,244,616 B2
(45) Date of Patent: *Jan. 26, 2016

(54) MANAGEMENT SYSTEM AND MANAGEMENT METHOD OF STORAGE SYSTEM THAT PERFORMS CONTROL BASED ON REQUIRED PERFORMANCE ASSIGNED TO VIRTUAL VOLUME

(71) Applicant: Hitachi, Ltd., Tokyo (JP)

(72) Inventors: Kyoko Miwa, Kawasaki (JP); Tsukasa Shibayama, Kawasaki (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,701

(22) Filed: Mar. 24, 2015

(65) Prior Publication Data
US 2015/0193148 A1 Jul. 9, 2015

Related U.S. Application Data

(63) Continuation of application No. 13/384,998, filed as application No. PCT/JP2011/070890 on Sep. 13, 2011, now Pat. No. 9,015,412.

(51) Int. Cl.
*G06F 3/06* (2006.01)
*G06F 13/10* (2006.01)

(52) U.S. Cl.
CPC ........ *G06F 3/061* (2013.01); *G06F 3/06* (2013.01); *G06F 3/0649* (2013.01); *G06F 3/0665* (2013.01); *G06F 3/0685* (2013.01); *G06F 3/0689* (2013.01); *G06F 13/10* (2013.01)

(58) Field of Classification Search
CPC ..... G06F 3/0605; G06F 3/0665; G06F 3/067; G06F 3/0685; G06F 3/0644; G06F 3/061; G06F 3/0604; G06F 3/0649; G06F 3/0689
USPC .......... 711/170, E11.207, 117, 112, 114, 162, 711/165, E12.002, E12.009
See application file for complete search history.

(56) References Cited

U.S. PATENT DOCUMENTS 7,657,675 B1 * 2/2010 Hoffman et al. ................. 710/60
7,822,939 B1 10/2010 Veprinsky et al.
(Continued)

FOREIGN PATENT DOCUMENTS

JP 2003-001591 6/2001
JP 2008-097502 10/2006
(Continued)

OTHER PUBLICATIONS

Ari, Ismail, et al.; SANCache—Performance Boosting & Workload Isolation in Storage Area Networks; Hewlett Packard Laboratoes, Proceedings of IEEE Conference on Mass Storage Systems and Technologies (IEEE MSST 2006), May 2006; 20 pages.

(Continued)

*Primary Examiner* — Pierre-Michel Bataille
(74) *Attorney, Agent, or Firm* — Foley & Lardner LLP

(57) ABSTRACT

A storage system manages a pool to which multiple VVOLs (virtual logical volumes conforming to thin provisioning) are associated, assigns a real area (RA) from any tier in an available tier pattern associated with a write-destination VVOL to a write-destination virtual area (VA), and carries out a reassignment process for migrating data inside this RA to an RA of a different tier than the tier having this RA based on the access status of the RA assigned to the VA. A management system assumes that a specified tier has been removed from the available tier pattern of a target VVOL, predicts the performance of the target VVOL and all the other VVOL associated with the pool to which the target VVOL is associated, determines whether or not there is a VVOL for which the predicted performance is lower than a required performance, and when such a VVOL does not exist, instructs the storage system to remove the specified tier from the available tier pattern of the target VVOL.

20 Claims, 33 Drawing Sheets

| VVOL ID (901) | Subsystem ID (902) | Host ID (903) | Pool ID (904) | SLO (msec) (905) | Avail-able tier (906) | Capacity (907) | Used Capacity (908) | Performance (msec) (909) | Access distribution (910) | | |
|---|---|---|---|---|---|---|---|---|---|---|---|
| | | | | | | | | | 0-249 (Page) | ... | TOTAL (Page) |
| VVOL1 | SUB1 | Host1 | Pool A | 8 | Tier1 Tier2 Tier3 | 600GB | 250 GB | 6 | 5,000 16.7% | ... | 30,000 100% |
| VVOL2 | SUB1 | Host2 | Pool A | 4 | Tier1 Tier2 Tier3 | 200GB | 18 GB | 2 | 2,900 19.3% | ... | 15,000 100% |
| VVOL3 | SUB4 | Host2 | Pool A | 12 | Tier1 Tier2 Tier3 | 1.2TB | 650 GB | 9 | 650 21.7% | ... | 3,000 100% |
| VVOL4 | SUB3 | host3 | Pool B | 15 | Tier3 | 6.0TB | 20 GB | 10 | 8,000 51.3% | ... | 100% |
| ... | ... | ... | ... | ... | ... | ... | ... | ... | ... | ... | ... |

804

(56) References Cited

U.S. PATENT DOCUMENTS

| | | |
|---|---|---|
| 8,195,913 B2 | 6/2012 | Kakui et al. |
| 8,402,214 B2 * | 3/2013 | Kawaguchi .................. 711/114 |
| 8,566,546 B1 | 10/2013 | Marshak et al. |
| 8,612,683 B2 * | 12/2013 | Jin et al. ...................... 711/117 |
| 8,688,909 B2 | 4/2014 | Ishizaki et al. |
| 8,694,727 B2 * | 4/2014 | Naganuma et al. ........... 711/117 |
| 8,849,758 B1 | 9/2014 | Sivasubramanian et al. |
| 8,984,221 B2 * | 3/2015 | Satoyama et al. ............ 711/114 |
| 2006/0095666 A1 | 5/2006 | Furuhashi et al. |
| 2008/0082777 A1 * | 4/2008 | Sakaguchi et al. ........... 711/170 |
| 2009/0300285 A1 | 12/2009 | Nagai et al. |
| 2010/0100678 A1 * | 4/2010 | Kobayashi .................... 711/114 |
| 2010/0191906 A1 | 7/2010 | Beniyama et al. |
| 2010/0217933 A1 | 8/2010 | Oe et al. |
| 2011/0167236 A1 | 7/2011 | Orikasa et al. |
| 2011/0252214 A1 | 10/2011 | Naganuma et al. |
| 2011/0289287 A1 | 11/2011 | Yamamoto et al. |
| 2012/0198153 A1 | 8/2012 | Fuente et al. |

FOREIGN PATENT DOCUMENTS

| | | |
|---|---|---|
| JP | 2007-066259 A | 3/2007 |
| WO | WO-2011/077489 | 6/2011 |
| WO | WO 2011/092739 A1 | 8/2011 |
| WO | WO-2013/018128 A1 | 2/2013 |
| WO | WO-2013/065081 A1 | 5/2013 |
| WO | WO-2013/171794 A1 | 11/2013 |
| WO | WO-2014/016866 A1 | 1/2014 |

OTHER PUBLICATIONS

International Search Report for PCT/JP2011/070890 issued on Nov. 8, 2011.

* cited by examiner

| Pool ID | Page ID | VVOL ID | Last Access Time | Access Frequency (IOPS) |
|---|---|---|---|---|
| | 00000 | VOL2 | 2011/12/5 15:02:59 | 12531 |
| | 00001 | VOL1 | 2011/12/5 15:03:03 | 2 |
| | 00002 | N/A | - | |
| | ... | ... | ... | ... |
| Pool A | 02000 | VOL2 | 2011/11/3 10:55:23 | 0 |
| | ... | ... | ... | ... |
| | 12000 | VOL3 | 2011/11/2 7:39:02 | 950 |
| | ... | ... | ... | ... |
| | 32000 | VOL1 | 2011/11/1 5:48:02 | 0 |
| | ... | ... | ... | ... |
| ... | | | | |

| Pool ID | Page ID | Media ID | Media LBA | | VVOL ID | VVOL LBA | |
|---|---|---|---|---|---|---|---|
| 501 | 502 | 503 | 504 | | 505 | 506 | |
| | | | Start | End | | Start | End |
| Pool A | 0000 | M001 | 0 | 0999 | VVOL2 | 0135000 | 0135999 |
| | 0001 | | 1000 | 1999 | VVOL1 | 0094600 | 0094699 |
| | 0002 | | 2000 | 2999 | N/A | - | - |
| | ... | | ... | ... | ... | ... | ... |
| | 1000 | M002 | 0 | 0999 | VVOL2 | 0055000 | 0055999 |
| | ... | | ... | ... | ... | ... | ... |
| | 2000 | M003 | 0 | 0999 | VVOL3 | 4398000 | 4398999 |
| | 2001 | M004 | 0000 | 0999 | VVOL1 | 0001000 | 0001999 |
| ... | ... | ... | ... | ... | ... | ... | ... |

| Pool ID | Media ID | Tier Level | Access Frequency Limit (IOPS) | Access Frequency (IOPS) |
|---|---|---|---|---|
| Pool A | M001 | Tier 1 | 200,000 | 145,000 |
| | M002 | Tier 2 | 18,000 | 9,600 |
| | M003 | Tier 2 | 18,000 | 12,000 |
| | M004 | Tier 3 | 12,000 | 2,9000 |
| ... | ... | ... | ... | ... |

| VOL ID | capacity | VOL type | Host ID | Pool ID | Available tier |
|---|---|---|---|---|---|
| VVOL1 | 600GB | VVOL | Host1 | Pool A | Tier1, Tier2, Tier3 |
| VVOL2 | 200GB | VVOL | Host2 | Pool A | Tier1, Tier2, Tier3 |
| ... | ... | ... | ... | ... | ... |
| M001 | 50GB | SSD | N/A | N/A | N/A |
| M002 | 50GB | SAS | N/A | N/A | N/A |
| ... | ... | ... | ... | ... | ... |

| VVOL ID | Subsystem ID | Host ID | Pool ID | SLO (msec) | Available tier | Capacity | Used Capacity | Performance (msec) | Access distribution | | |
|---|---|---|---|---|---|---|---|---|---|---|---|
| | | | | | | | | | 0-249 (Page) | ... | TOTAL (Page) |
| VVOL1 | SUB1 | Host1 | Pool A | 8 | Tier1 Tier2 Tier3 | 600GB | 250 GB | 6 | 5,000 16.7% | ... | 30,000 100% |
| VVOL2 | SUB1 | Host2 | Pool A | 4 | Tier1 Tier2 Tier3 | 200GB | 18 GB | 2 | 2,900 19.3% | ... | 15,000 100% |
| VVOL3 | SUB4 | Host2 | Pool A | 12 | Tier1 Tier2 Tier3 | 1.2TB | 650 GB | 9 | 650 21.7% | ... | 3,000 100% |
| VVOL4 | SUB3 | host3 | Pool B | 15 | Tier3 | 6.0TB | 20 GB | 10 | 8,000 51.3% | ... | 100% |
| ... | ... | ... | ... | ... | ... | ... | ... | ... | ... | ... | ... |

| Tire Level 1001 | Media Type 1002 | Performance (msec) 1003 | Access Frequency Limit (IOPS) 1004 |
|---|---|---|---|
| Tier1 | SSD | 1 | 25000 |
| Tier2 | SAS | 10 | 2500 |
| Tier3 | SATA | 20 | 1250 |

VVOL list

Warning: There is a VVOL that does not meet SLO

| VVOL ID | Sub System ID | Host ID | Pool ID | Capacity | Used Capacity | SLO (msec) | Performance (msec) | Available tier |
|---|---|---|---|---|---|---|---|---|
| VVOL 1 | SUB1 | Host1 | Pool A | 600GB | 250GB | 8 | 6 | Tier1 Tier2 Tier3 |
| VVOL 2 | SUB1 | Host2 | Pool A | 200GB | 18GB | 4 | 12(Warning) | Tier1 Tier2 Tier3 |
| VVOL 3 | SUB4 | Host2 | Pool A | 1.2TB | 650GB | 12 | 9 | Tier1 Tier2 Tier3 |
| VVOL 4 | SUB3 | host3 | Pool B | 6.0TB | 20GB | 15 | 10 | Tier3 |
| ... | ... | ... | ... | ... | ... | ... | ... | ... |

FIG. 14

Warning

> 1405  
> Following VVOL do not meet required performance

| VVOL ID | Sub System ID | Host ID | Pool ID | Capacity | Used Capacity | SLO (msec) | Performance (msec) | Available tier |
|---|---|---|---|---|---|---|---|---|
| VVOL 2 | SUB1 | Host2 | Pool A | 200GB | 18GB | 4 | 12 (Warning) | Tier1 Tier2 Tier3 |
| ... | ... | ... | ... | ... | ... | ... | ... | ... |

| VVOL ID | Access distribution | | | Total | Media ratios | | | Performance (msec) | SLO (msec) | Pre-change tier | Post-change tier |
|---|---|---|---|---|---|---|---|---|---|---|---|
| | 0-249 (Page) | 250-499 (Page) | ... | 2500- (Page) | SSD | SAS | SATA | | | | |
| VVOL 1 | 5,000 | 3,333 | ... | 111 | 22,000 | 30 ⇒10 | 50 ⇒90 | 20 ⇒0 | 6 ⇒7 | 8 | Tier1 Tier2 Tier3 | Tier1 Tier2 |
| VVOL 2 | 2,900 | 200 | ... | 100 | 15,000 | 10 ⇒100 | 40 ⇒0 | 50 ⇒0 | 12 ⇒3 | 4 | Tier1 Tier2 Tier3 | Tier1 |
| VVOL 3 | 3,000 | 2,000 | ... | 30 | 18,000 | 10 ⇒5 | 40 ⇒30 | 50 ⇒65 | 9 ⇒13 | 12 | Tier1 Tier2 Tier3 | Tier1 Tier2 Tier3 |

| VOL ID | capacity | VOL type | Host ID | Pool ID | Available tier | Candidate tier |
|---|---|---|---|---|---|---|
| VVOL1 | 600GB | VVOL | Host1 | Pool A | Tier1 | Tier1 |
| VVOL2 | 200GB | VVOL | Host2 | Pool D | Tier,Tier3 | Tier1, Tier2, Tier3 |
| ... | ... | ... | ... | ... | ... | ... |
| M001 | 50GB | SSD | N/A | N/A | N/A | N/A |
| M002 | 50GB | SAS | N/A | N/A | N/A | N/A |
| ... | ... | ... | ... | ... | ... | ... |

| Host ID | Tier ID | Time | New used capacity | Used capacity during measurement |
|---|---|---|---|---|
| Host1 | Tier1 | 10:00-11:00 | 5GB | - |
| | | 11:00-12:00 | 4GB | 1GB |
| | | 12:00-13:00 | 0GB | - |
| | | ... | ... | ... |
| | Tier2 | 10:00-11:00 | 2GB | - |
| | | 11:00-12:00 | 0GB | 0GB |
| | | 12:00-13:00 | 0GB | - |

2104 — Host ID
2105 — Tier ID
2106 — Time
2107 — New used capacity
2108 — Used capacity during measurement

FIG. 22

| Pool ID | Tier ID | Time | New used capacity | Used capacity during measurement | Free capacity |
|---|---|---|---|---|---|
| Pool 1 | Tier1 | 10:00-11:00 | 10GB | 0GB | 20GB |
| | | 11:00-12:00 | 8GB | 1GB | |
| | | 12:00-13:00 | 1GB | 0GB | |
| | | ... | ... | ... | |
| | Tier2 | 10:00-11:00 | 4GB | 0GB | 100GB |
| | | 11:00-12:00 | 1GB | 1GB | |
| | | 12:00-13:00 | 1GB | 0GB | |

| VVOL ID | Sub System ID | Host ID | Pool ID | SLO (msec) | Pre-change tier | Post-change tier |
|---|---|---|---|---|---|---|
| VVOL1 | Sub1 | Host1 | Pool A | 8 | Tier1 | Tier1 |
| VVOL2 | Sub1 | Host2 | Pool B | 4 | Tier2<br>Tier3 | Tier1<br>Tier2<br>Tier3 |
| VVOL3 | Sub4 | Host2 | Pool A | 12 | Tier2 | Tier1<br>Tier2 |
| VVOL4 | Sub3 | Host3 | Pool C | 15 | Tier3 | Tier1<br>Tier2<br>Tier3 |
| ... | ... | ... | ... | ... | ... | ... |

| Capacity | Used Capacity | Performance (msec) | Access distribution | | |
|---|---|---|---|---|---|
| | | | 0-249 | ... | Total |
| 600GB | 250GB | 6 | 5,000 16.7% | ... | 30,000 100% |
| 200GB | 18GB | 2 | 2,900 19.3% | ... | 15,000 100% |
| 1.2TB | 650GB | 9 | 650 21.7% | ... | 3,000 100% |
| 6.0TB | 20GB | 10 | 8,000 51.3% | ... | 100% |
| ... | ... | ... | ... | ... | ... |

804

907 — Capacity
908 — Used Capacity
909 — Performance
910 — Access distribution

FIG. 26

| Host ID | Sub System ID | Tier ID | Time | New used capacity |
|---|---|---|---|---|
| Host1 | Sub 01 | Tier1 | 10:00-11:00 | 5GB |
| | | | 11:00-12:00 | 4GB |
| | | | 12:00-13:00 | 0GB |
| | | | ... | ... |
| | | Tier2 | 10:00-11:00 | 2GB |
| | | | 11:00-12:00 | 0GB |
| | | | 12:00-13:00 | 0GB |
| | Sub02 | Tier1 | 10:00-11:00 | 5GB |
| | | | 11:00-12:00 | 4GB |
| | | | 12:00-13:00 | 0GB |
| | | Tier2 | ... | ... |

| Pool ID | Sub System ID | Tier ID | Time | New used capacity | Free capacity |
|---|---|---|---|---|---|
| 2701 | 2702 | 2703 | 2704 | 2705 | 2706 |
| Pool1 | SUB 01 | Tier1 | 10:00-11:00 | 10GB | 20GB |
| | | | 11:00-12:00 | 8GB | |
| | | | 12:00-13:00 | 1GB | |
| | | | 13:00-14:00 | 10GB | |
| | | | ... | ... | |
| | | Tier2 | 10:00-11:00 | 4GB | 100GB |
| | | | 11:00-12:00 | 1GB | |
| | | | 12:00-13:00 | 1GB | |

808

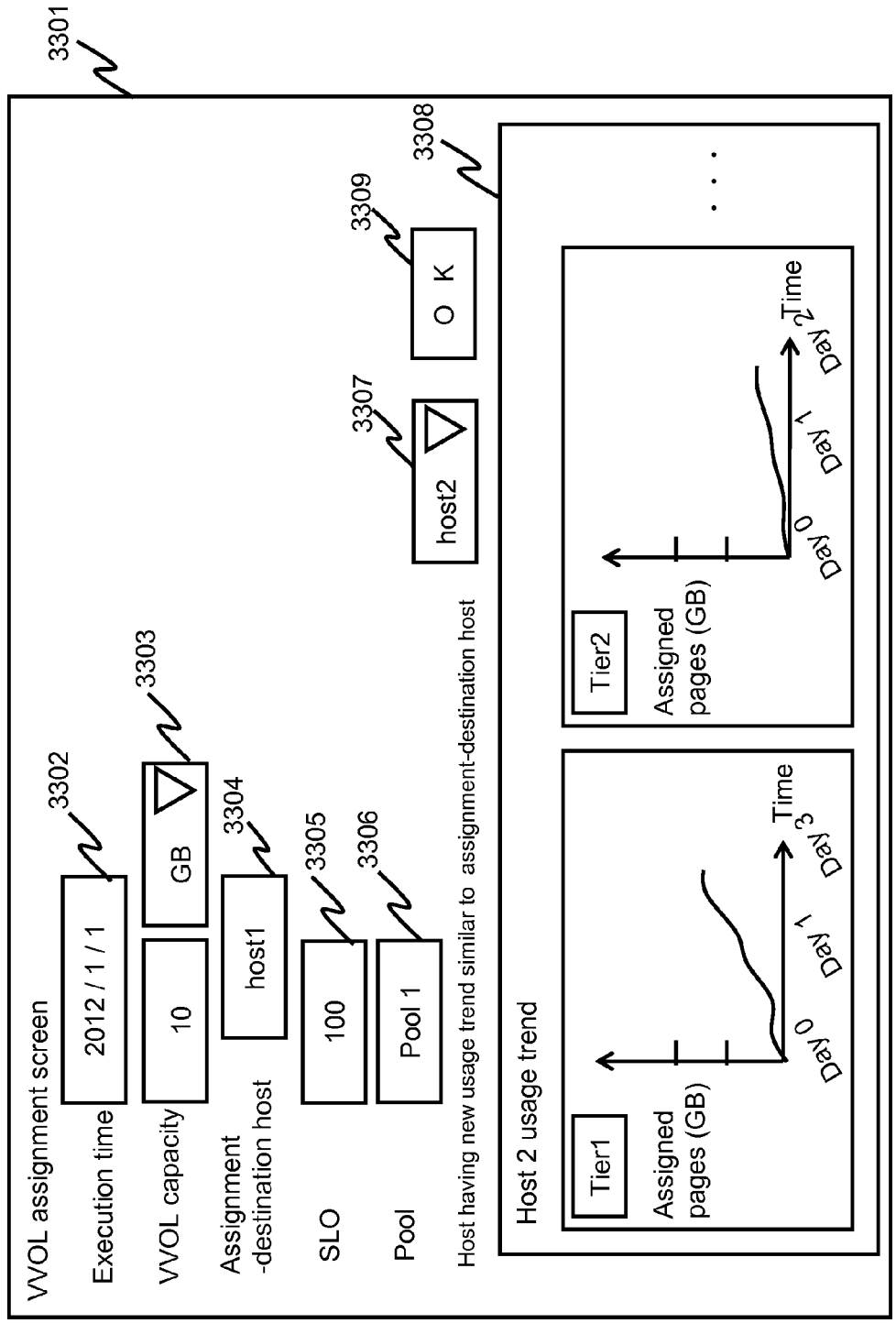

MANAGEMENT SYSTEM AND MANAGEMENT METHOD OF STORAGE SYSTEM THAT PERFORMS CONTROL BASED ON REQUIRED PERFORMANCE ASSIGNED TO VIRTUAL VOLUME

CROSS-REFERENCE TO RELATED PATENT APPLICATIONS

This application is a Continuation of U.S. application Ser. No. 13/384,998 (National Stage of PCT/JP2011/070890), filed Dec. 11, 2012, which issued as U.S. Pat. No. 9,015,412 on Apr. 21, 2015, incorporated herein by reference in its entirety.

TECHNICAL FIELD

The present invention relates to technology for managing a storage system that performs control based on a required performance assigned to a virtual volume.

BACKGROUND ART

A storage apparatus having multiple physical storage devices, and a storage system comprising one or more storage apparatuses are known. As a physical storage device, for example, there is a hard disk drive, a flash memory device, and so forth. The storage apparatus generally comprises a RAID group that conforms to RAID (Redundant Array of Independent (or Inexpensive) Disks) technology. The RAID group comprises multiple physical storage devices. Data is stored in the RAID group in accordance with a prescribed RAID level. Either one or multiple logical storage devices (logical volumes) are created based on the storage space of the RAID group. The logical volume is provided to a host computer coupled to the storage apparatus. The host computer sends the storage apparatus an access command (for example a write command or a read command) specifying the provided logical volume. Data access to this logical volume is carried out in accordance with this.

As the storage apparatus, a storage apparatus in which thin provisioning (may also be called dynamic provisioning) technology is used is known (Patent Literature 1). According to thin provisioning, a virtual volume (referred to as VVOL hereinafter), which is a virtual logical volume, is provided to the host computer instead of the fixed-storage-capacity logical volume. The VVOL is a set of multiple virtual areas (virtual storage areas). In a case where a write is generated to the VVOL from the host computer, a page is assigned from a pool to the virtual area. Furthermore, the pool is a storage area comprising multiple pages. The page is a real area (a substantial storage area), and, more specifically, for example, is a storage area obtained by using a LBA (Logical Block Address) to partition the logical volume, which comprises the pool. As used here, the "LBA" is an address used for specifying a location on a logical volume in a case where the host computer reads/writes data from/to the storage apparatus.

Furthermore, a pool in which multiple groups of pages with different access performance coexist is known (Patent Literature 2). For example, a high-performance page group comprises a high-performance logical volume, and a low-performance page group comprises a low-performance logical volume. The access performance of a logical volume depends on the access performance (and/or the RAID level of the RAID group) of the physical storage device that constitutes the basis of this logical volume. Reassignment (page reassignment hereinafter) can be carried out from a certain page inside a certain logical volume to a page inside a different logical volume.

Furthermore, among the logical volumes comprising the pool, a set of logical volumes having the same access performance is generally called a tier. In other words, the pool comprises multiple tiers, that is, multiple page groups with different access performance.

In Patent Literature 2, a tier to be assigned to each VVOL can be specified in accordance with the required performance of each VVOL. As used here, the required performance of the VVOL denotes the performance required with respect to this VVOL, for example, the throughput, response time, or other such access performance.

In accordance with this, for example, it is preferable to assign a high-performance tier to a VVOL with a high required performance, and to assign a low-performance tier to a VVOL having a low access frequency.

Patent Literature 3 discloses a method for deciding a storage capacity to be added to the pool in a case where the pages assigned to the VVOL are insufficient. In other words, Patent Literature 3 discloses a technology for regularly predicting a depletion of pool capacity, and preparing for the pool capacity depletion.

CITATION LIST

Patent Literature

[PTL 1]
Japanese Patent Application Laid-open No. 2003-001591
[PTL 2]
Japanese Patent Application Laid-open No. 2007-066259
[PTL 3]
Japanese Patent Application Laid-open No. 2008-097502

SUMMARY OF INVENTION

Technical Problem

A single pool may be shared by multiple VVOLs, in other words, multiple VVOLs may be associated with a single pool. Generally speaking, a page is assigned to a virtual area of the VVOL from a pool with which this VVOL is associated, and a page is not assigned from a pool with which this VVOL is not associated.

For this reason, when high-performance pages (pages making up a high-performance tier) are preferentially assigned from the pool to a specific VVOL, the high-performance pages become depleted, resulting in a situation in which high-performance pages can no longer be assigned to other VVOL (existing VVOL and/or newly added VVOL) that share this same pool with this VVOL. That is, preferentially assigning high-performance pages to a specific VVOL makes it possible to meet the required performance of the specific VVOL, but may give rise to a case in which it is not possible to meet the required performance of the other VVOL.

To solve for this problem, a method for adding a high-performance page group to a high-performance tier in the pool is conceivable. However, the problem is that it is necessary to add a high-performance physical storage device on which to base the high-performance page group, thereby increasing costs.

Another conceivable method is to carry out a page reassignment, which migrates data inside the high-performance page assigned to the specific VVOL to a low-performance page (a page making up a low-performance tier), and assigns this migration-destination low-performance page to the specific VVOL instead of the migration-source high-performance page. This increases the high-performance pages capable of being assigned to the other VVOL. However, the problem is that going to the trouble of carrying out a page reassignment to increase the assignable high-performance pages places an unnecessary load on the storage apparatus.

Therefore, an object of the present invention is to make it possible to meet the required performance of each VVOL associated with a single pool in an environment in which multiple VVOLs share a single pool without performing a page reassignment or adding a high-performance physical storage device as described hereinabove.

Solution to Problem

A storage system is configured from one or more storage apparatuses, and comprises a pool, and multiple VVOLs (virtual logical volumes that conform to Thin Provisioning), which are associated with this pool. The pool comprises multiple tiers. The multiple tiers are multiple groups of real areas for which access performance differs.

The storage system receives a write command from a higher-level apparatus (for example, a host computer or another storage system), assigns a real area from any tier in an available tiers pattern associated with a write-destination VVOL to a write-destination virtual area from among multiple virtual areas comprising the write-destination VVOL identified on the basis of this write command, and writes data conforming to this write command to the assigned real area. Furthermore, the configuration is such that, based on the access status of the real area assigned to the virtual area, the storage system performs a reassignment process for migrating data inside this real area to a real area of a tier that differs from the tier of this real area. The access status is typically an access frequency, but may be another type of access status (for example, a last access time) either instead of or in addition to the access frequency.

A management system for managing a storage system like this stores management information comprising VVOL management information, which is information denoting the required performance and available tier pattern for each VVOL. The VVOL required performance is the performance required for this VVOL. The VVOL available tier pattern is one or more tiers, which are allowed to be the assignment source of a real area assigned to this VVOL.

The management system assumes that a first specified tier has been removed from the available tier pattern of a target VVOL, which is one of multiple VVOLs, and that data inside a real area associated with the target VVOL has been migrated from the first specified tier to a real area inside a different tier in the available tier pattern of the target VVOL, predicts the performance of the target VVOL and all the other VVOLs associated with the pool with which the target VVOL is associated. The management system identifies the required performance corresponding to the VVOL from the VVOL management information, and determines whether or not there is a VVOL for which the above-mentioned predicted performance is lower than the required performance by comparing this required performance to the predicted performance for each VVOL. In a case where the result of this determination is negative, the management system instructs the storage system to remove the first specified tier from the available tier pattern of the target VVOL.

The "required performance" referred to here, for example, may be a SLO, which will be described using first through third examples explained further below, or may be the product of the SLO and a coefficient g.

Furthermore, the management system may be outside the storage system, or may be inside the storage system.

Advantageous Effects of Invention

According to the present invention, in an environment in which multiple VVOLs share a single pool, it is possible to change the available tier for each VVOL to an extent that meets the required performances of the multiple VVOLs sharing this pool.

BRIEF DESCRIPTION OF DRAWINGS

FIG. 5 shows an example of a pool management table 303 related to the first example.

FIG. 6 shows an example of a media status management table 304 related to the first example.

FIG. 7 shows an example of a VOL management table 305 related to the first example.

FIG. 9 shows an example of a VVOL management table 804 related to the first example.

FIG. 10 shows an example of a tier definition table 805 related to the first example.

FIG. 13 shows an example of a VVOL list display interface related to the first example.

FIG. 14 shows an example of a VVOL status monitoring alert interface related to the first example.

FIG. 17 shows an example of a VVOL performance measurement management table related to the first example.

FIG. 20 shows an example of a VOL management table 305 related to the second example.

FIG. 21 shows an example of a host usage trend management table 306 related to the second example.

FIG. 22 shows an example of a pool usage trend management table 307 related to the second example.

FIG. 24 shows a portion of an example of a VVOL management table 804 related to the second example.

FIG. 25 shows the remainder of the example of the VVOL management table 804 related to the second example.

FIG. 26 shows an example of a host usage trend measurement result table 807 related to the second example.

FIG. 27 shows an example of a pool usage trend measurement result table 808 related to the second example.

FIG. 33 shows an example of a VVOL creation/assignment interface related to the third example.

DESCRIPTION OF THE EMBODIMENT

Figure 1:
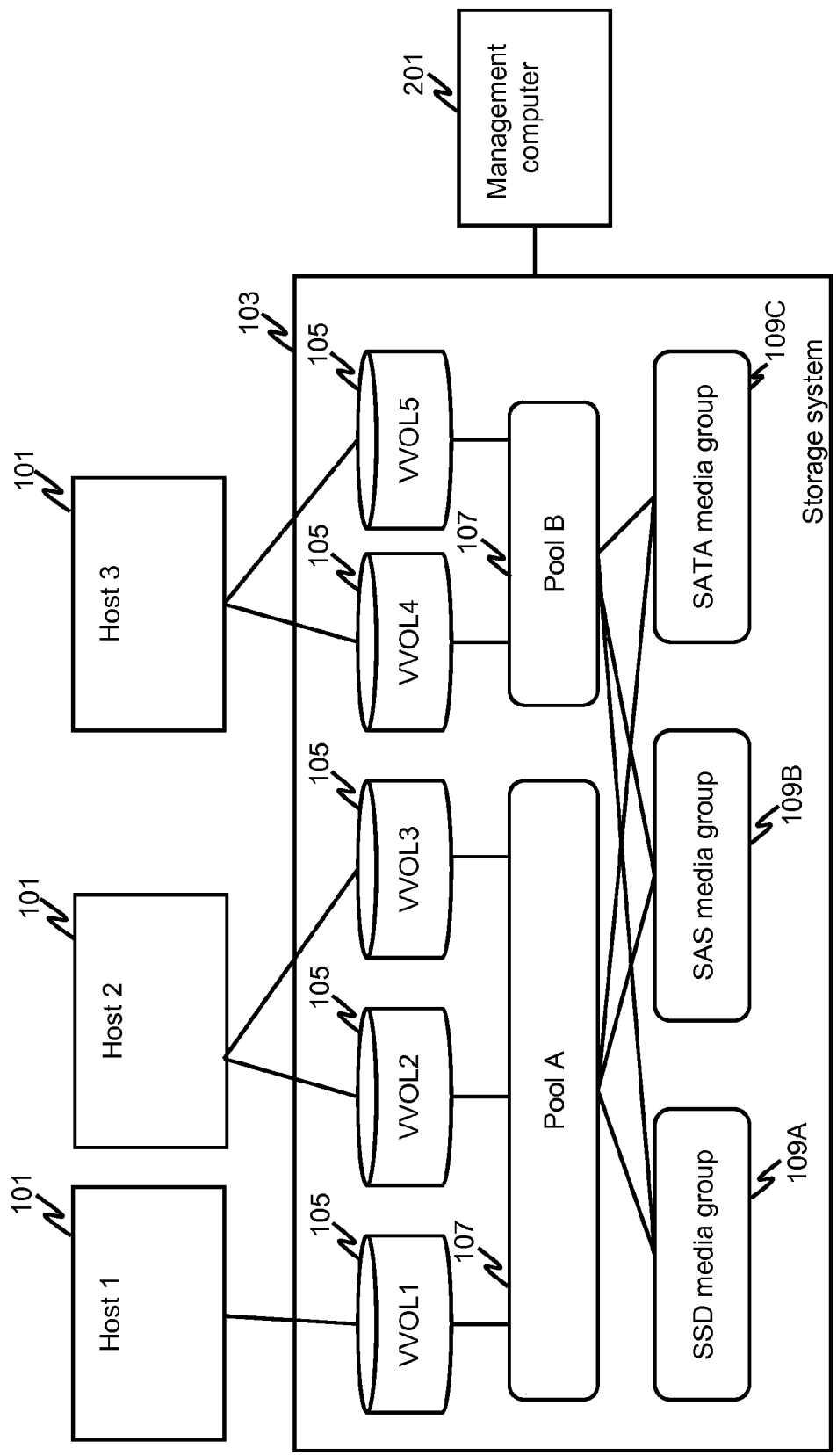
FIG. 1 shows an example of a storage system 103 related to a first example.

A number of examples of the present invention will be explained. Furthermore, the technical scope of the present invention is not limited to the respective examples.

Furthermore, in the following explanation, various types of information may be explained using the expression "xxx table", but the various information may also be expressed using a data structure other than a table. To show that the various information is not dependent on the data structure, "xxx table" can be called "xxx information".

Furthermore, in the following explanation, there may be cases where the processing is explained using a "program" as the doer of the action, but since the stipulated processing may be performed in accordance with a program being executed by a processor (for example, a CPU (Central Processing Unit)) while using a storage resource (for example, a memory) and/or a communication control device (for example, a communication port) as needed, the processing entity may also be the processor. Also, processing, which is explained having the program as the doer of the action may be processing that is carried out by the management system. Furthermore, either all or a part of a program may be realized using dedicated hardware. For this reason, processing explained having the program as the doer of the action may be processing that is carried out by a controller. The controller may comprise a processor and a storage resource for storing a computer program to be executed by the processor, or may comprise the above-mentioned dedicated hardware. A computer program may be installed in respective computers from a program source. The program source, for example, may be either a program delivery server or a storage medium.

Furthermore, the management system is one or more computers, for example, either a management computer or a combination of a management computer and a display computer. Specifically, for example, in a case where a management computer displays display information, the management computer is the management system. Furthermore, the same functions as those of the management computer may be realized using multiple computers to make processing faster and more reliable, and in this case, the relevant multiple computers (may include a display computer in a case where a display computer carries out displays) are the management system.

Example 1

First, an overview of a first example of the present invention will be explained.

In a storage apparatus in which thin provisioning technology and data reassignment technology are employed, when the tier capable of being used by a certain VVOL is changed in order to enhance the performance of this VVOL in an environment in which multiple VVOLs are sharing the same pool, the performance of the other VVOL that share the same pool as this VVOL may be degraded, making it impossible to meet the required performance of the respective VVOL. In this example, the required performance of multiple VVOLs can be met by not only changing the available tier of the VVOL regarding which there is a desire to enhance performance, but also changing the available tier of the other VVOL that share the pool with this VVOL.

The first example will be explained in detail below by referring to the drawings.

FIG. 1 shows an example of a storage system 103 related to the first example of the present invention.

A host computer 101 and a management computer 201 are coupled to the storage system 103. The storage system 103 comprises one or more storage apparatuses. Thin provisioning technology is employed in at least one of the one or more storage apparatuses. The storage system 103 comprises multiple groups of media for which performance differs. A media group is a set of one or more media. Furthermore, in the following explanation, "media" refers to a logical volume.

In this example, the multiple media groups may comprise three media groups, specifically, an SSD (Solid State Drive) media group 109A, a SAS (Serial Attached SCSI) medial group 109B, and a SATA (Serial ATA (Advanced Technology Attachment)) media group 109C.

The SSD media group 109A comprises SSD media (a logical volume based on SSD). The SAS media group 109B comprises SAS media (a logical volume based on SAS-HDD (Hard Disk Drive)). The SATA media group 109C comprises SATA media (a logical volume based on SATA-HDD).

These three media groups need not all be different media groups. For example, at least one of these three media groups may be a different type of media group. Also, the number of media groups may be equal to or larger than two. For example, media groups of the same type may be divided into two or more different media groups in accordance with access performance. For example, SAS media groups 109B may be divided into a media group based on 10 K/rpm SAS (SAS capable of operating at 10,000 revolutions per minute), and 15K/rpm SAS (SAS capable of operating at 15,000 revolutions per minute). A media group may be provided from a storage apparatus that differs from the storage apparatus comprising the pool 107 (an external media group).

The storage system 103 comprises one or more pools 107 (pools A and B in the drawing). Each pool 107 comprises multiple media having different performance. Specifically, for example, each pool 107 comprises one or more SSD media of the SSD media group 109A, one or more SAS media of the SAS media group 109B, and one or more SATA media of the SATA media group 109C. Each media is partitioned into multiple pages. For this reason, each pool 107 comprises a group of SSD pages, a group of SAS pages, and a group of SATA pages. Each media may be a component of one pool, and does not need to be a component common to two or more pools. Furthermore, in FIG. 1, the lines connecting the pools 107 with the respective media groups 109 do not signify physical couplings, but rather denote that the pools 107 comprise the respective media groups 109 as was described hereinabove.

Furthermore, there are multiple tiers in one pool 107. One tier comprises one or more media of the same performance. For this reason, for example, there is a tier comprising SSD media as a high-level tier, a tier comprising SAS media as a mid-level tier, and a tier comprising SATA media as a low-level tier. Furthermore, the "same performance" may be performance that is completely the same, or may be performance that is substantially the same (for example, the difference in access performance is equal to or less than a prescribed difference).

An access frequency range (a range of access frequencies) is associated with each tier. Access frequency is the number of accesses for unit of time, and, for example, is expressed as IOPS (Input/Output Per Second). IOPS is the unit of the number of accesses (I/O) carried out per second. The storage system 103 comprises multiple VVOLs (for example, VVOL 1 through VVOL 5) 105.

The VVOL 105 is provided to anyone host computer 101 from among the multiple host computers 101. In this example, the VVOL 105 and the host computer 101 have a one-to-one correspondence. Furthermore, in FIG. 1, the line connecting the host computer 101 to the VVOL 105 does not signify a physical coupling, but rather denotes that the VVOL 105 is recognized by the host computer 101 (the VVOL 105 is being provided to the host computer 101). Similarly, the lines connecting the pools 107 to the VVOL 105 also do not signify physical couplings, but rather denote the fact that the VVOL 105 are associated with the pools 107.

The VVOL 105 is a virtual logical volume that conforms to this provisioning, and comprises multiple virtual areas (virtual storage areas). The virtual storage area, for example, is an address (for example, a LBA). In a case where the storage system 103 receives a write command from the host computer 101 specifying the VVOL 105, when a page (real area) is not assigned to the write-destination virtual area identified from this write command, an unused page is assigned from the pool with which this write-destination VVOL 105 is associated, and write-target data conforming to this write command is written to this assigned page.

The host computer 101 is an example of an access source. The host computer 101 accesses the provided VVOL 105. Specifically, the host computer 101 sends the storage system 103 an access command comprising access destination information. The access destination information is information denoting the access destination, and, for example, comprises the ID of the VVOL 105 (for example, a LUN (Logical Unit Number)), and the ID of the virtual area (for example, the LBA).

Figure 2:
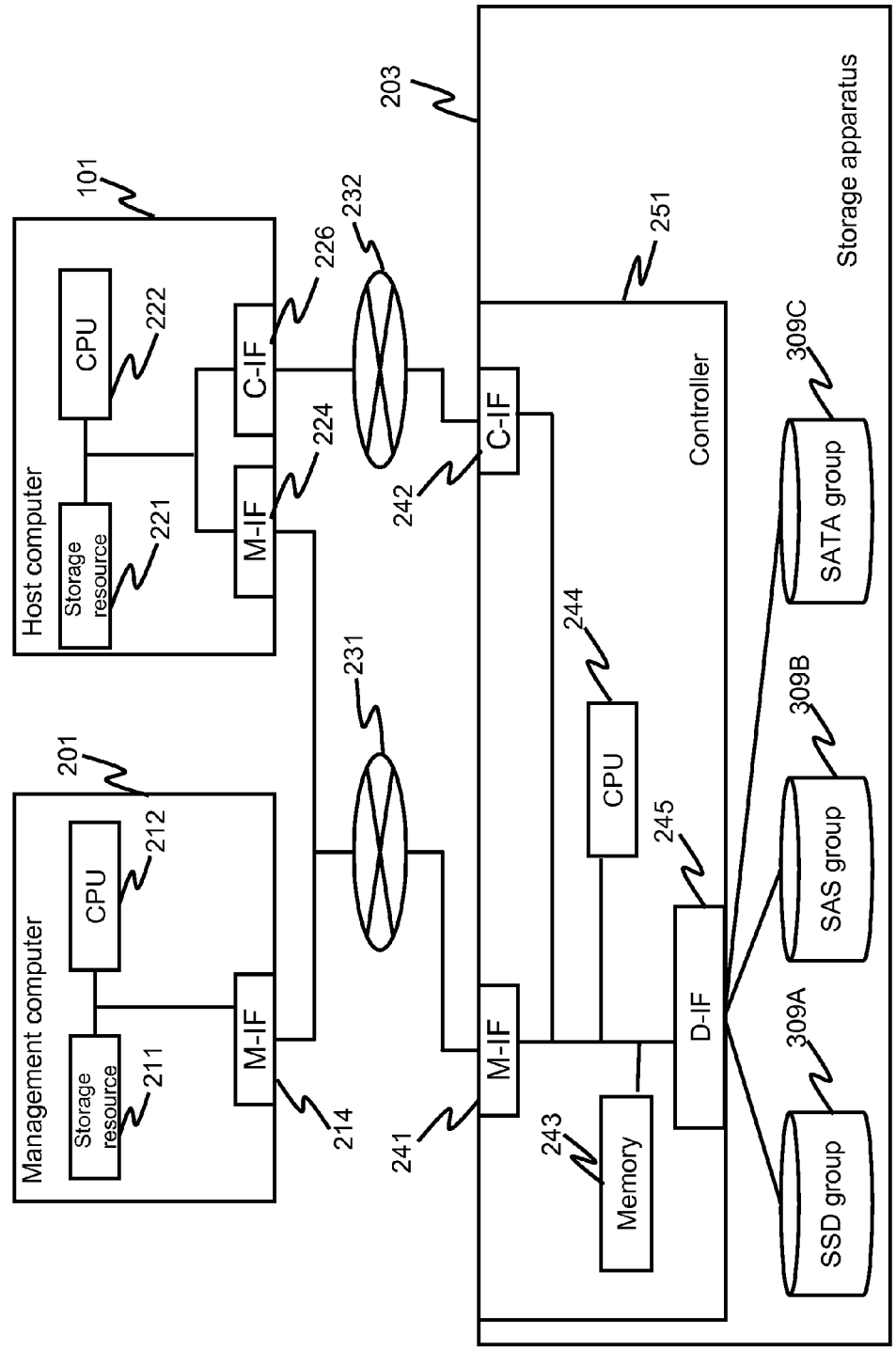
FIG. 2 shows examples of the configurations of a host computer 101, a management computer 201, and a storage apparatus 203 related to the first example.

FIG. 2 shows examples of the configurations of the host computer 101, the management computer 201, and a storage apparatus 203.

The storage apparatus 203 is coupled to the host computer 101 and the management computer 201 by way of a first communication network (for example, a LAN (Local Area Network)) 231. The storage apparatus 203 is also coupled to the host computer 101 by way of a second communication network (for example, a SAN) 232. The first communication network 231 and the second communication network 232 may be integrated.

The storage apparatus 203 comprises a group of physical storage devices and a controller 251, which is coupled to this physical storage device group.

The physical storage device group comprises one or more physical storage devices. The physical storage device groups include an SSD group 309A, a SAS group 309B, and a SATA group 309C. The SSD group 309A is one or more SSD, the SAS group 309B is one or more SAS-HDD, and the SATA group 309C is one or more SATA-HDD. Multiple physical storage devices having different performance exist together like this in the storage apparatus 203. Furthermore, the physical storage device group may be provided from outside of the storage apparatus 203.

The controller 251 comprises a management I/F (described in the drawing as M-I/F) 241, a communication I/F (described in the drawing as C-I/F) 242, a device I/F (described in the drawing as D-I/F) 245, a memory 243, and a processor 244, which is coupled to these components.

The M-I/F 241 is a communication interface device (for example, a NIC (Network Interface Card)) for carrying out communications using a first protocol. The C-I/F 242 is a communication interface device for carrying out communications using a second protocol.

The D-I/F 245 is a communication interface device for communicating with the physical storage device using a third protocol. A D-I/F 245 may exist for each type of physical storage device. The controller 251 accesses the physical storage device via the D-I/F 245.

The memory 243 stores a computer program, which is executed by the processor 244, and a variety of information. Furthermore, the memory 243 comprises a cache memory area. The cache memory area temporarily stores data that conforms to a write command received from the host computer 101, and data that has been read from a page (that is, the physical storage device assigned to the page) in response to a read command received from the host computer 101.

Write-target data inside the cache memory area is stored in the physical storage device that is assigned to the write-destination virtual area. Read-target data inside the cache memory area is provided to the host computer 101.

The host computer 101 comprises a M-I/F (for example, a NIC) 224, a C-I/F (for example, a HBA (Host Bus Adapter)) 226, a storage resource 221, and a processor 222, which is coupled to these components. The storage resource 221, for example, is a memory (may comprise an auxiliary storage device such as a hard disk drive). The storage resource 221, for example, stores an application program (for example, a business program) and a OS (Operating System), and the processor 222 executes this application program and OS.

The management computer 201 comprises a M-I/F (for example, a NIC) 214, a storage resource 211, and a processor 212, which is coupled to these components. The storage resource 211, for example, is a memory (may comprise an auxiliary storage device such as a hard disk drive). The storage resource 211 stores a computer program and a variety of information. The computer program is executed by the processor 212.

The preceding is an example of the hardware configuration of the computer system related to this example. Furthermore, the above-mentioned communication interface devices (M-I/F and C-I/F), for example, will differ according to the type of network to which this I/F is coupled, and the type of apparatus in which this I/F is included.

Figure 3:
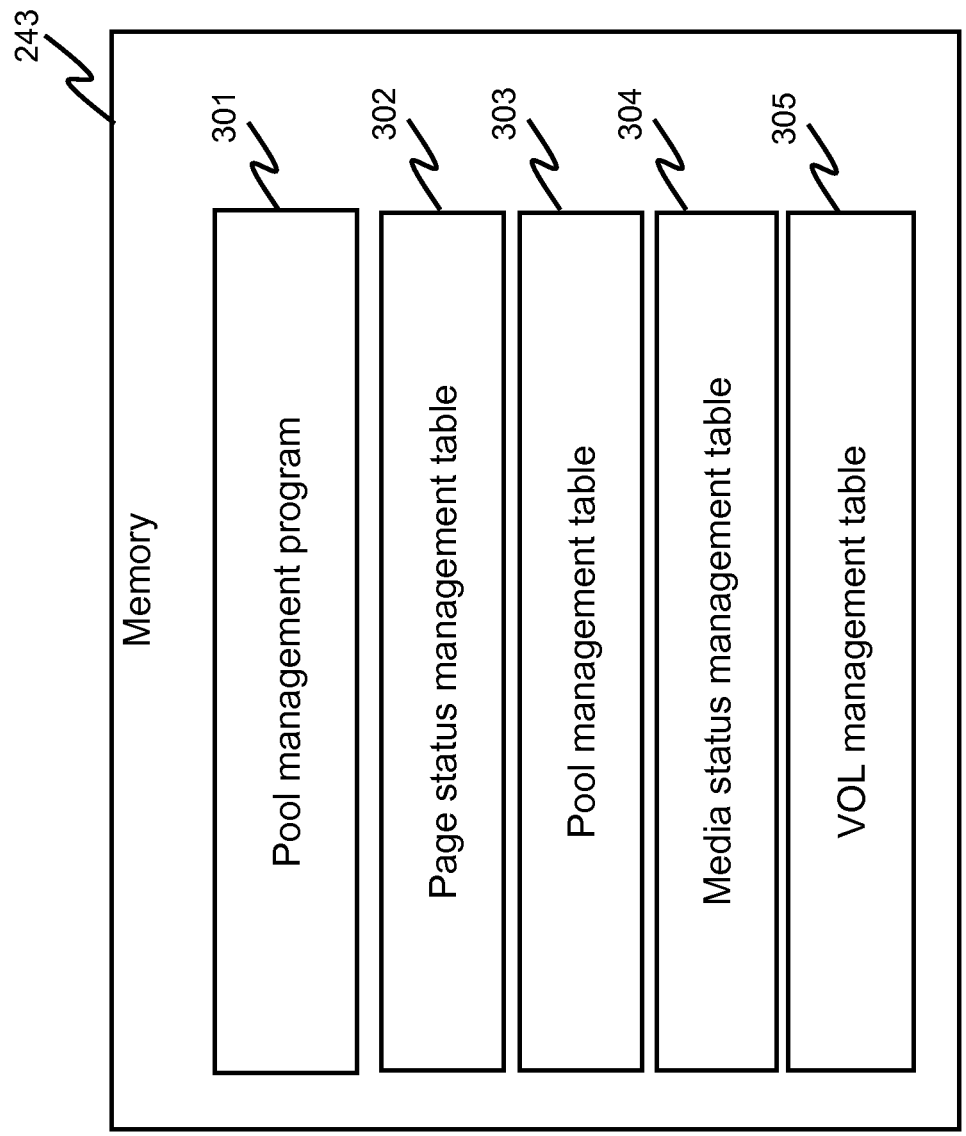
FIG. 3 shows examples of a program and information stored in a memory 243 of a controller 251 related to the first example.

FIG. 3 shows an example of a program and information stored in the memory 243.

The memory 243 stores a pool management program 301, a page status management table 302, a pool management table 303, a media status management table 304, and a VOL management table 305.

The pool management program 301 is for managing a pool 107 of the storage system 103. The pool management program 301 is executed by the processor 244, and realizes various types of processing based on the respective types of tables (302 through 305). First, the various types of tables (302 through 305) will be explained.

Figure 4:
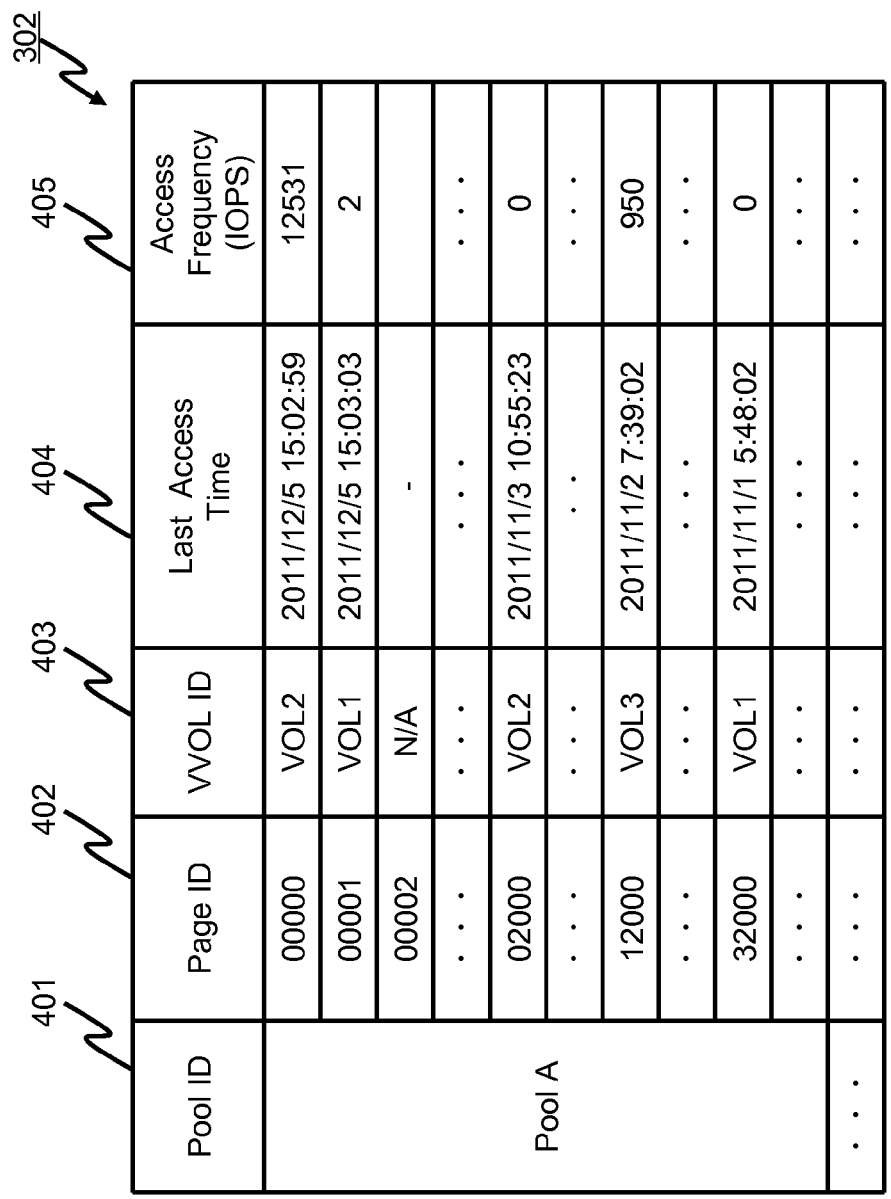
FIG. 4 shows an example of a page status management table 302 related to the first example.

FIG. 4 shows an example of a page status management table 302.

The page status management table 302 denotes the status of each page. According to the page status management table 302, it is clear whether or not a page configuring the pool is assigned to a virtual area of the VVOL.

Specifically, for example, the table 302 comprises the following information for each page.

- A pool ID 401: Information for identifying the pool that comprises the page.
- A page ID 402: Information for identifying a page.
- a VVOL ID 403: Information for identifying a VVOL comprising the assignment-destination virtual area of the page. "N/A (Not Assigned)" shows that the page has not been assigned to any virtual area.
- A last access time 404: Information denoting the time when the page was last accessed.
- An access frequency 405: Information showing the frequency with which the page is accessed.

Furthermore, the last access time 404 may be managed by being divided into the "time of last write to page" and the "time of last read from page".

The access frequency 405 may also be managed by being divided into a "write frequency" and a "read frequency". The access frequency 405 is updated in a case where an access has been carried out with respect to a page, and is not update in a case where an access was not carried out with respect to a page even though an access command was received.

FIG. 5 shows an example of a pool management table 303.

The pool management table 303 denotes the corresponding relationship between the respective pages configuring the pool and the virtual areas. The pool management table 303 makes clear the type of media and the range of addresses in that media that make up each page configuring the pool.

Specifically, for example, the table 303 comprises the following information for each page.

- A pool ID 501: Information for identifying the pool of a page.
- A page ID 502: Information for identifying a page.
- A media ID 503: Information for identifying the media of a page.
- A media LBA 504: Information showing the location of a page in the media (for example, the start LBA of a page and the end LBA of this page).
- A VVOL ID 505: Information for identifying a VVOL, which is the assignment destination of the page. "N/A" denotes that the page is not assigned to any virtual area.
- A VVOL LBA 506: Information showing the location of the assignment-destination virtual area of the page (for example, the start LBA of a virtual area and the end LBA of this virtual area).

FIG. 6 shows an example of a media status management table 304.

The media status management table 304 comprises information related to the status of a media. The media status management table 304 makes clear each media configuring the pool, and the tier level to which each media belongs.

Specifically, for example, the table 304 comprises the following information for each media.

- A pool ID 601: Information for identifying a pool of a media.
- A media ID 602: Information for identifying a media.
- A tier level 603: Information denoting the level of the tier to which the media belongs.
- An access frequency limit 604: Information denoting the upper limit value of the access frequency for the media. In the drawing, the access frequency limit 604 is shown as the limit of the number of pages capable of being accessed by the media within a unit of time.
- An access frequency 605: Information showing the access frequency of the media. In the drawing, the access frequency 605 denotes the number of pages accessed by the media within a unit of time.

FIG. 7 shows an example of a VOL management table 305.

The VOL management table 305 comprises information related to a volume of the storage apparatus 203 (for example, all the volumes). The VOL management table 305, in a case where the volume is a VVOL, makes clear the host computer to which this VVOL is providing a virtual area, the pool that is assigning a page to this VVOL, and the type of tier that the VVOL can use.

Specifically, for example, the VOL management table 305 comprises the following information for each volume.

- A VOL ID 701: Information for identifying either a VVOL or a media.
- A capacity 702: Shows the storage capacity of either the VVOL or the media.
- A volume type 703: Denotes the type of volume. The volume type denotes whether the volume is a VVOL or a media. In a case where the volume is a media, the volume type 703 denotes SSD, SAS, or SATA.
- A host ID 704: Information for identifying the host computer that is the provision destination of the volume.
- A pool ID 705: Information for identifying a pool that is associated with the VVOL.
- An available tier 706: Information denoting a tier that can be used by the VVOL.

A "tier that can be used by the VVOL" is a tier that may be selected as the assignment source of the page assigned to this VVOL. A page is not assigned to the VVOL from a tier other than the tier (a usable tier) denoted by the available tier 706 associated with this VVOL. The usable tier is typically selected from the following patterns in a case where the pool comprises three tiers, i.e., tier 1 (high-level tier), tier 2 (mid-level tier), and tier 3 (low-level tier).

(Pattern 1) Tier 1
(Pattern 2) Tier 2
(Pattern 3) Tier 3
(Pattern 4) Tier 1, Tier 2
(Pattern 5) Tier 1, Tier 3
(Pattern 6) Tier 2, Tier 3
(Pattern 7) Tier 1, Tier 2, Tier 3

For example, in the case of a VVOL for which "(Pattern 1) Tier 1" has been selected as the available tier 706, a page is preferentially assigned from tier 1. In the case of a VVOL for which "(Pattern 6) Tier 2, Tier 3" has been selected as the available tier, a page is assigned from either tier 2 or tier 3, and a page is not assigned from tier 1 no matter how high the access level of the page might be.

Furthermore, an available tier 706 pattern, as shown in "(Pattern 5) Tier 1, Tier 3", for example, can discretely select a tier or tiers to the exclusion of another tier (tier 2 in this case).

The preceding has been explanations of the tables 302 through 305. Furthermore, a mapping management table (not shown in the drawing) denoting which page has been assigned for each virtual area may be prepared in addition to these tables. Whether or not a page has been assigned to a virtual area may be determined on the basis of this mapping management table.

The pool management program 301 (refer to FIG. 2) is executed by the processor 244 on the basis of the above-described tables 302 through 305, and, for example, the following processing is carried out.

(A) The processor 244 carries out write processing comprising the following (a1) through (a9) processes by executing the program 301.

(a1) The program 301 receives a write command from the host computer 101.

(a2) The program 301 identifies the write-destination VVOL and the write-destination virtual area based on the access-destination information of the write command.

(a3) The program 301 stores the write-target data conforming to the write command in a cache memory area. Furthermore, the program 301 may respond to the host computer 101 that the write has been completed.

(a4) The program 301 determines whether a page has been assigned to the write-destination virtual area identified in the above (a2) based on the page status management table 302 (or the above-mentioned mapping management table).

(a5) In a case where the result of the determination in the above (a4) is affirmative, the program 301 writes the write-target data inside the cache memory area to the page assigned to the write-destination virtual area.

(a6) In a case where the result of the determination in the above (a4) is negative, the program 301 identifies a tier that can be used by the write-destination VVOL based on the VOL management table 305. Then, the program 301, based on the VOL management table 305, the page status management table 302 or the pool management table 303, and the media status management table 304, identifies from within the pool that is associated with the write-destination VVOL an unused page (a page that has not been assigned to any virtual area) belonging to a tier that the write-destination VVOL can use. At this point, the program 301 may identify, based on the media status management table 304, an unused page from a media that belongs to the highest level tier possible from among the media that the write-destination VVOL is capable of using.

(a7) The program 301 associates the page identified in the above (a6) with the write-destination virtual area. Specifically, for example, the program 301 writes the start LBA and the end LBA of the write-destination virtual area to the pool management table 303 as the VVOL LBA 506 corresponding to the assigned page.

(a8) The program 301 writes the write-target data in the cache memory area to the page identified in the above (a6) (the program 301 may respond to the host computer 101 at this stage that the write has been completed).

(a9) The program 301 updates the last access time 404 and the access frequency 405 of the data write-destination page in the page status management table 302 in either the above (a5) or (a8). And pursuant to this, the program 301 updates the access frequency 605 of the media that comprises this page in the media status management table 304.

Furthermore, in a case where a page could not be assigned from the desired tier due to insufficient capacity or some other reason, a page assignment failure can be avoided by assigning a page from a nearby tier.

(B) The program 301 carries out read processing comprising the following processes (b1) through (b8).

(b1) The program 301 receives a read command from the host computer 101.

(b2) The program 301 identifies the read-source VVOL and the read-source virtual area based on access-destination information of the read command.

(b3) The program 301 determines whether or not the read-target data is still in the cache memory area.

(b4) In a case where the result of the determination in the above (b3) is affirmative, the program 301 sends the read-target data in the cache memory area to the host computer 101. In this case, the last access time 404 and the access frequency 405 of the page assigned to the read-source virtual area (and the access frequency 605 of the media comprising this page) are not updated.

(b5) In a case where the result of the determination in the above (b3) is negative, the program 301 determines whether a page has been assigned to the read-source virtual area identified in the above (b2) based on the page status management table 302 (or the above-mentioned mapping management table).

(b6) In a case where the result of the determination in the above (b5) is negative, the program 301 sends the host computer 101 prescribed data (for example, error).

(b7) In a case where the result of the determination in the above (b5) is affirmative, the program 301 reads the data from the page assigned to the read-source virtual area, and writes this data to the cache memory area. Then, the program 301 sends the host computer 101 this data that is in the cache memory area.

(b8) The program 301, in the above (b6), updates the last access time 404 and the access frequency 405 of the data write-destination page in the page status management table 302. Also, pursuant to this, the program 301 updates the access frequency 605 of the media comprising this page in the media status management table 304.

(C) The program 301 carries out media addition processing comprising the following processes (c1) through (c3). After the (c3), page reassessing processing (E) which will be explained later may be carried out.

(c1) The program 301 assigns an ID to an addition-target media.

(c2) The program 301 partitions the addition-target media into pages, and assigns an ID to each page produced in accordance with the partitioning.

(c3) The program 301 adds information related to the addition-target media (the ID of the media addition-destination pool, the media ID assigned in (c1), and the page ID assigned in (c2)) to the tables 302 through 305.

(D) The program 301 carries out media deletion processing comprising the following processes (d1) and (d2).

(d1) The program 301 executes a page reassignment process for reassigning the data inside all the used pages in a deletion-target media (pages assigned to any virtual areas) to another media.

(d2) The program 301 deletes the information related to the deletion-target media from the tables 302 through 305.

(E) The program 301 can carry out page reassignment processing comprising the following processes (e1) through (e4). In accordance with this, for example, the memory 243 may comprise a below-described tier definition table of the management computer 201. This page reassignment process may be carried out on a regular basis. Also, this page reassignment process may be used in the page reassignment process in the above-mentioned (d1). Furthermore, the page reassignment process may be carried out in accordance with an available tier update, which will be described further below.

(e1) The program 301 finds a reassignment-source page. The reassignment-source page is the page in which inappropriately assigned data is stored. Specifically, the reassignment-source page is a page for which the page access frequency 405 does not belong to the access frequency range of the tier that comprises this page. However, this is not limited to a case in which a tier that can be used by the VVOL is limited to a specific tier, and the processing is this case will be described further below. Furthermore, the reassignment-source page is the used page inside the deletion-target media in the page reassignment process of the above (d1).

(e2) The program 301 identifies the tier corresponding to the access frequency range to which the access frequency 405 of the reassignment page found in the above (e1) belongs.

(e3) The program 301 identifies an unused page from the tier identified in (e2) above. The unused page identified here is the reassignment-destination page.

(e4) The program 301 reassigns the data inside the reassignment-source page identified in (e1) above to the reassignment-destination page identified in (e3) above. Furthermore, the program 301 assigns the reassignment-destination page to the virtual area to which the reassignment-source page is assigned instead of to the reassignment-source page (tables 302 and 303 are updated).

The program 301, for example, may carry out (x1) and (x2) below with respect to the VVOL that constitutes the target of the page reassignment processing of (e1) through (e4):

(x1) sequentially select tiers from a high-level tier to a low-level tier; and (x2) preferentially select a VVOL with which a preferred tier pattern (a high-priority tier pattern) of the tier selected in the (x1) above is associated as an available tier rather than a VVOL with which the preferred tier pattern of the tier selected in the (x1) above is not associated as an available tier. As used here, the preferred tier pattern of the tier selected in the (x1) above is the tier pattern in which the tier selected in the above (x1) is the lowest level tier.

An example of a case in which the following six tier patterns can be used as available tiers in a pool comprising three tiers, i.e., tier 1 (a high-level tier), tier 2 (a mid-level tier), and tier 3 (a low-level tier) will be explained here.

(Pattern 1) Tier 1
(Pattern 2) Tier 2
(Pattern 3) Tier 3
(Pattern 4) Tier 1, Tier 2
(Pattern 5) Tier 2, Tier 3
(Pattern 6) Tier 1, Tier 2, Tier 3

In this case, the preferred tier pattern of tier 1 is (Pattern 1), in which tier 1 is the lowest level tier, and the preferred tier patterns of tier 2 are (pattern 2) and (pattern 4), in which tier 2 is the lowest level tier.

The page reassignment process in this example, for example, is as explained in (m1) through (m4) below.

(m1) First, the program 301 identifies a VVOL with which the tier 1 preferred tier pattern (Pattern 1) is associated as the available tier, and assigns data in the page associated with this VVOL to the tier 1. In accordance with this, in a case where the page assigned to the VVOL is in a tier other than tier 1, the page in the tier 1, which is the assignment destination of the data from this page, is assigned to the VVOL instead of to this page.

(m2) Next, the program 301 identifies, from among the patterns other than the preferred tier pattern (Pattern 1), the VVOL with which a tier pattern (either (Pattern 4) or (Pattern 6)) comprising tier 1 is associated as the available tier.

(m3) The program 301 assigns the data in the page to tier 1 in order from the page assigned to a virtual area having a high access frequency (IOPS) from among the page group associated with the VVOL identified in (m2). The program 301 does not assign to the tier 1 data in a page assigned to the VVOL with which Pattern 2, 3 or 5, which does not comprise tier 1, is associated as the available tier no matter how high the access frequency of the page assignment-destination virtual area is.

(m4) The program 301 also applies the same processing as (m1) through (m3) to the tier pattern (Pattern 2) for which the page reassignment process has not been executed from among the tier 2 preferred patterns ((Pattern 2) and (Pattern 4)).

Specifically, the program 301 implements the page reassignment process for a page assigned to the VVOL with which Pattern 2 is associated as the available pattern using the same processing as (m1). Then, the program 301 executes the page reassignment process for a page assigned to the VVOL with which Pattern 5 (the tier pattern that includes tier 2 but is not a tier 2 preferred tier pattern) is associated as the available pattern using the same processing as (m2) and (m3).

(m5) The program 301 implements the page reassignment process for a page assigned to the VVOL with which the remaining tier pattern (Pattern 3) is associated as the available pattern.

One characteristic feature of this example is that, without providing a preferred ranking to a VVOL with which a pattern other than the preferred tier pattern is associated, the assignment destination of the data in the page assigned to this VVOL is decided based on the access frequency of the page's assignment-destination virtual area. Using this method makes it possible to assign data in a high access frequency page to the highest level tier possible.

Furthermore, the page reassignment process of (E) may be carried out based on the length of time that has elapsed since the last access time 404 of each page either instead of or in addition to comparing the access frequency to the access frequency range. That is, the assignment destination of data in a page may be decided based on another type of access information either instead of or in addition to the access frequency, for example, the elapsed time from the last access time.

Deciding on a page to be assigned to a VVOL based on the available tier associated with this VVOL like this makes it possible to assign a page that meets the required performance of this VVOL.

Provided there are no limits placed on the available tier, a high-performance page (a page in a high-performance tier) equivalent to a high access frequency virtual area is assigned, and a low-performance page (a page in a low-performance tier) equivalent to a low access frequency virtual area is assigned. However, as in this example, in a case where a pattern comprising only a high-performance tier is associated with a VVOL as the available tier of this VVOL, a high-performance page is assigned to the virtual area no matter how small the access frequency is for each virtual area. This is because a page cannot be assigned as the available tier of a VVOL from a tier other than the tier associated with this VVOL. For this reason, even when the access frequency of a virtual area is low, a high response can be expected when there is a read command with respect to this virtual area.

Figure 8:
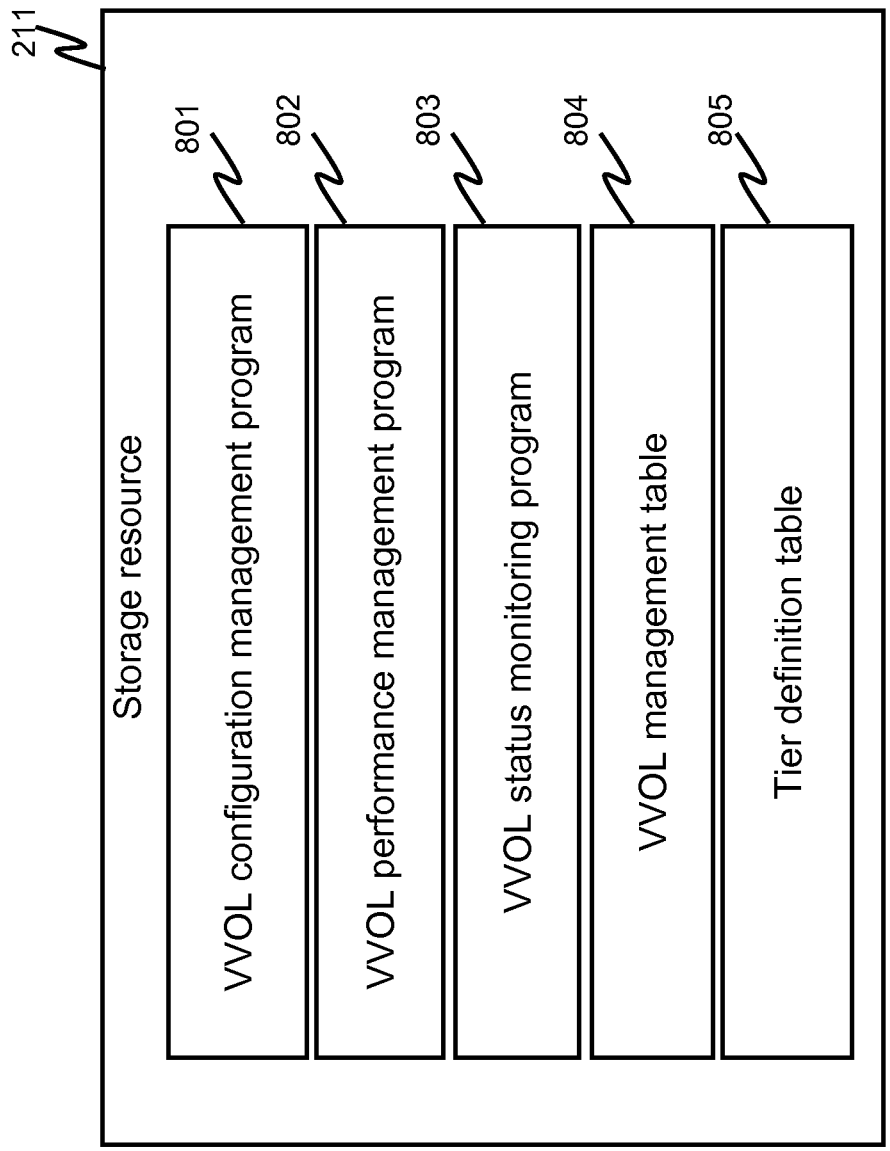
FIG. 8 shows examples of programs and information stored in a storage resource 211 inside the management computer 201 related to the first example.

FIG. 8 shows examples of programs and tables stored in the storage resource 211 in the management computer 201.

As the programs, a VVOL configuration management program 801, a VVOL performance management program 802, and a VVOL status management program 803 are stored. As information, a VVOL management table 804 and a tier definition table 805 are stored.

FIG. 9 shows an example of the VVOL management table 804.

The VVOL management table 804 comprises information related to the VVOL.

The VVOL management table 804 makes clear the required performance required by each VVOL, the pool that is providing a page to the virtual area of each VVOL, and the types of tiers comprising this pool.

Specifically, for example, the VVOL management table 804 comprises the following information for each VVOL.

A VVOL ID 901: Information for identifying a VVOL.

A subsystem ID 902: Information for identifying the storage apparatus 203 comprising the VVOL.

A host ID 903: Information for identifying the host computer with which the VVOL is associated.

A pool ID 904: Information for identifying a pool associated with the VVOL.

A SLO 905: Information showing the SLO (Service Level Objective) of the VVOL, that is, the required performance of the VVOL. The SLO 905 includes required performance related to access performance, such as the response time and throughput of the VVOL. Hereinafter, it is supposed that the SLO 905 is response time.

An available tier 906: Information showing a Tier that the VVOL is capable of using.

A capacity 907: Information denoting the capacity of the VVOL.

A used capacity 908: Information denoting the total storage capacity of the virtual areas to which pages are assigned.

A performance 909: Information denoting the performance (typically, the access performance) of the VVOL.

An access distribution 910: Information denoting the total number of pages and the percentage of pages corresponding to an access frequency range for each access frequency range. The percentage of pages is the percentage of the total number of pages corresponding to the access frequency range with respect to the total number of pages assigned to the VVOL. In the drawing, the size of the access frequency range is 250, but the size of the access frequency range, for example, is not limited to this provided that it is an integer of equal to or greater than 1. The VVOL configuration management program 801 can compute the access distribution 910 of each VVOL based on the page status management table 302.

However, in this example, the SLO 905 is either a threshold by which the performance 909 (computed value) is compared or a value based on this threshold.

The performance 909, for example, is the average response time of the VVOL. As used here, "response time", for example, is the length of time from when an access command specifying the VVOL is inputted to the storage apparatus 203 until a response is returned to the host computer 101.

The VVOL average response time can be computed using the following Equation (1).

(VVOL average response time)=(sum of products of access frequencies and response times for all pages assigned to VVOL)/(sum of access frequencies for all pages assigned to VVOL)   (1)

As was described hereinabove, the unit of access frequency here, for example, is the IOPS. For example, it is supposed that pages 1 through 6 are assigned to the VVOL. It is supposed that the "tier to which page belongs/access speed of this tier/access frequency of page" is as follows for each of pages 1 through 6.

Page 1: High-level tier (SSD)/1/100
Page 2: Mid-level tier (SAS)/10/50
Page 3: Mid-level tier (SAS)/10/20
Page 4: Low-level tier (SATA)/20/10
Page 5: Low-level tier (SATA)/20/5
Page 6: Low-level tier (SATA)/20/0

In this case, according to Equation (1), the VVOL average response time K is:

$$K=(100\times1+50\times10+20\times10+10\times20+5\times20+0\times20)/(100+50+20+10+15)$$

This works out to approximately 5.37. The access frequency is clear from the tier definition table 805, which will be explained further below.

The average response time (performance), which is determined in this way, is compared to the SLO (or a prescribed percentage of the SLO (for example, 80%)).

Furthermore, in the following explanation, the "SLO 905 is large/small" simply signifies that the value of the SLO is large or small. Also, the "performance 909 is large/small" simply signifies that the value of the performance 909 is large or small.

For example, in a case where the performance 909 is the average response time, the fact that the performance 909 (and the SLO) is large signifies that the performance is low (for example, the response time is long). Also, the fact that the performance 909 (and SLO) is small signifies that the performance is high (for example, the response time is short).

FIG. 10 shows an example of the tier definition table 805.

The tier definition table 805 denotes the definition of the tier. The tier definition table 805 makes clear the type of media comprising each tier, the performance of these media, and the maximum access frequency with respect to these media.

Specifically, for example, the tier definition table 805 comprises the following information for each tier.

A tier level 1001: Information denoting the level of the tier. The "tier level" is a numerical value denoting the height of the tier. In this example, the smaller the numerical value of a tier, the higher the tier.

A media type 1002: Information denoting the type of media that belongs to a tier.

A performance 1003: Information denoting the access speed with respect to the media.

A access frequency limit 1004: Information showing the maximum value of the access frequency corresponding to the tier.

The access frequency limit 1004 of each tier denotes the access frequency range of each tier. Specifically, according to the example of FIG. 10, the access frequency range of the high-level tier (SSD) is 25000 through 2500 (not including 2500). The access frequency range of the mid-level tier (SAS) is 2500 through 1250 (not including 1250). The access frequency range of the low-level tier (SATA) is 1250 through 0.

The processing carried out by this example will be explained in detail below.

<Virtual Volume Creation/Assignment Management>

The VVOL is managed by the processor 214 executing the VVOL configuration management program 801.

First, the VVOL configuration management program 801 receives a VVOL creation and assignment instruction from the user. The VVOL creation and assignment instruction comprises the identification information of the VVOL assignment-destination host, the VVOL capacity, and the SLO. Identification information of the pool associated with the VVOL may also be included.

Thereafter, the VVOL configuration management program 801, in response to the VVOL creation instruction, decides the storage apparatus 203, which is to be the VVOL creation destination, the pool to be associated with the VVOL, and the VVOL ID. Then, the VVOL configuration management program 801 adds an entry (a record) comprising information that accords with these decisions, and the capacity and SLO of the VVOL to the VVOL management table 804. Furthermore, information denoting that all tiers are capable of being used is registered in the available tier 906. For example, in a case where the pool is three tiers, i.e., tier 1, tier 2, and tier 3, a pattern comprising tier 1, tier 2 and tier 3 is registered as the available tiers. The pool to be associated with the VVOL may be selected at random, or the pool usage status (page assignment ratio) based on the pool management table 303 may be acquired from the storage apparatus 203 and the pool selected from among the pools for which unassigned pages are more numerous than a fixed criteria. In a case where the user has specified the pool to be associated with the VVOL, the specified pool is selected.

Next, the VVOL configuration management program 801 sends a VVOL addition instruction to the storage apparatus 203. The VVOL addition instruction comprises the VVOL ID, the VVOL capacity, the VVOL assignment-destination host ID, the ID of the pool associated with the VVOL, and the available tier. The pool management program 301 of the storage apparatus 203 that receives this instruction updates the VOL management table 305 based on the received instruction, and notifies the VVOL configuration management program 801 that VVOL addition is complete. The VVOL configuration management program 801 ends the processing in accordance with the completion-notification from the pool management program.

Furthermore, in this example, the available tier is not limited to only a specific tier at the point in time of the VVOL creation and assignment, but rather the available tier is adjusted as needed in accordance with the required performance of this VVOL using a VVOL performance management process, which will be described further below. However, as another example, the user may specify an available tier to be associated with the VVOL at the time of the VVOL creation and assignment. In accordance with this, the user-specified available tier is registered in the available tier column 906. Also, confirmation of whether or not the VVOL required performance is being met may be determined in accordance with whether pages are correctly assigned from the tier (s) that has/have been specified as the available tier.

Figure 11:
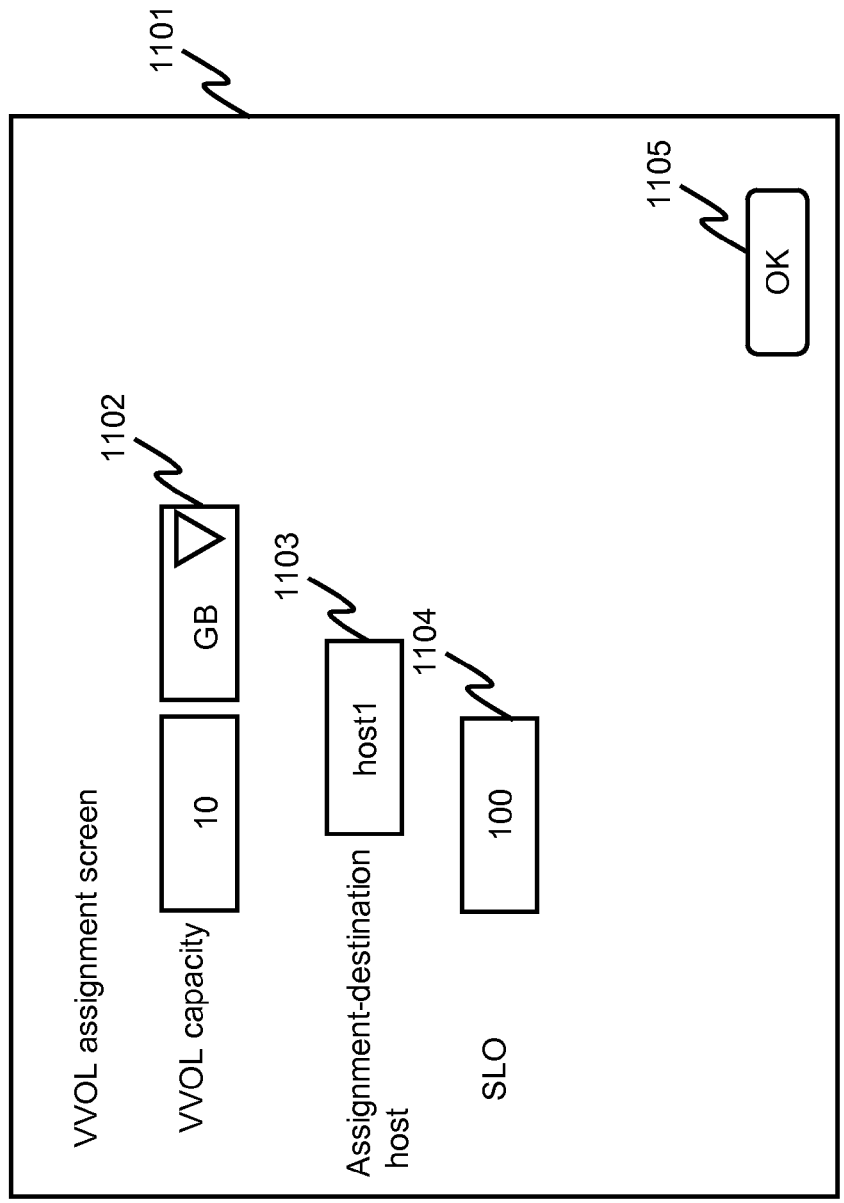
FIG. 11 shows an example of a VVOL creation/assignment interface 1101 related to the first example.

FIG. 11 shows an example of a VVOL creation/assignment interface 1101.

A VVOL creation and assignment instruction from the user to the VVOL configuration management program 801 may be carried out via a management interface 1101 like that shown in FIG. 11. The interface 1101, for example, is a GUI (Graphical user Interface), which is displayed by the management computer 201.

The management interface 1101 comprises a capacity specification column 1102 for the VVOL to be created, a specification column 1103 for specifying the host computer to be the assignment destination of the created VVOL, an SLO specification column 1104 for specifying the required performance (for example, the response time) of the created VVOL, and an OK button 1105 for instructing the VVOL configuration management program 801 to create and assign a VVOL in accordance with the specifications inputted in the various specification columns 1102 through 1104. The VVOL configuration management program 801 carries out the VVOL creation and assignment in accordance with the specifications that have been inputted to this interface 1101.

<Virtual Volume Status Monitoring>

Figure 12:
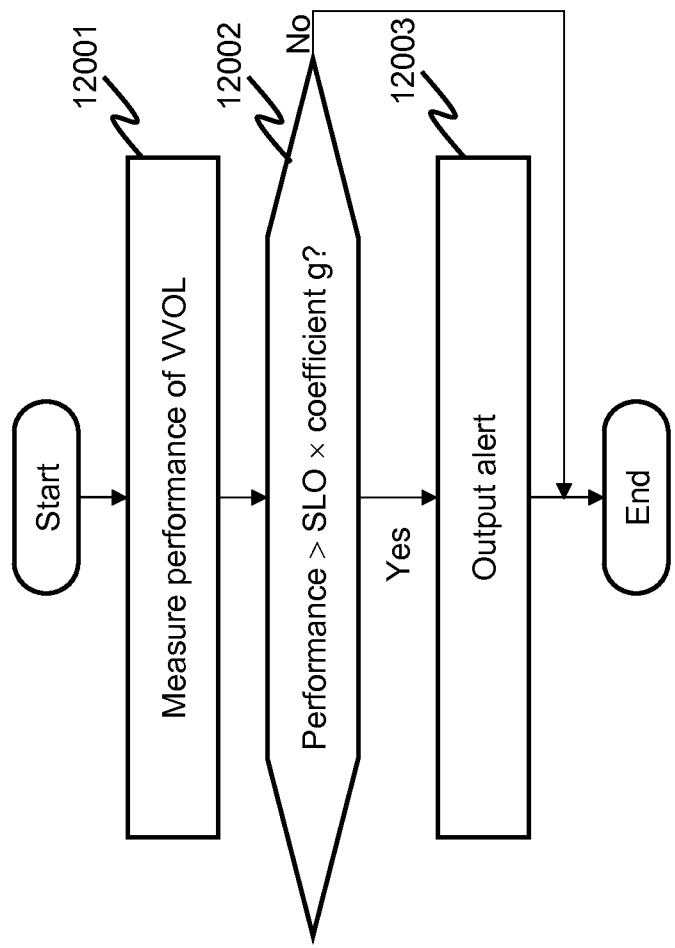
FIG. 12 is an example of a flowchart showing the flow of a VVOL status monitoring process related to the first example.

FIG. 12 is an example of a flowchart showing the flow of a VVOL status monitoring process.

This process, for example, is carried out in accordance with the processor 212 executing a VVOL status monitoring program 803 on a regular basis. The VVOL status monitoring program 803 uses this process to detect a VVOL that is not meeting the required performance (SLO).

The VVOL status monitoring program 803 measures the performance of each VVOL (S12001). Specifically, using one VVOL as an example, the following processes are carried out.

The VVOL status monitoring program 803 writes the total storage capacity of all the pages assigned to the VVOL to the used capacity 908 column corresponding to this VVOL in the VVOL management table 804.

The VVOL status monitoring program 803 computes the performance of the VVOL based on how many pages are assigned to the VVOL from which tier (s), and the speed of each tier. The VVOL status monitoring program 803 writes the information denoting the computed performance to the performance 909 column corresponding to the VVOL in the VVOL management table 804. The performance 909, for example, is the above-mentioned average response time K.

The VVOL status monitoring program 803 determines whether or not an inappropriate VVOL exists (S12002). An inappropriate VVOL is a VVOL whose performance 909 does not meet the SLO 905 (that is, a VVOL that does not meet the required performance). Specifically, for example, an inappropriate VVOL is a VVOL whose performance 909 is larger than the product of the SLO 905 and a coefficient g (for example, a VVOL whose average response time is longer than the product of the SLO 905 and the coefficient g). Furthermore, the coefficient g is a number that is greater than 0 and equal to or less than 1. In a case where g=1, the performance 909 is compared with the SLO 905 itself. This coefficient g does not necessarily have to be "1". That is, the performance 909 is not simply compared to the SLO 905, but rather can be compared to the "product of the SLO 905 and the coefficient g".

In a case where the result of the determination in S12002 is affirmative, the VVOL status monitoring program 803 outputs an alert 1 (S12003). This alert 1 signifies that the performance 909 is lower than the user-required SLO 905, that is, that an inappropriate VVOL exists. The alert 1, for example, may include the ID of the VVOL that was determined to be inappropriate in S12002.

In a case where the result of the determination in S12002 is negative, that is, in a case where an inappropriate VVOL has been found, the processing ends.

FIGS. 13 and 14 show examples of interfaces for notifying the user of an alert in S12003. Specifically, FIG. 13 shows an example of a VVOL list interface 1301. FIG. 14 shows an example of a VVOL status monitoring alert interface.

In accordance with the VVOL status monitoring process (refer to FIG. 12), when a VVOL that does not meet the required performance (an inappropriate VVOL) is discovered, the VVOL status monitoring program 803, for example, outputs an alert as shown in FIG. 13 to the user. The alert shown in FIG. 13 comprises a warning statement 1302 and the performance 1303 of the VVOL that is the target of the alert.

Furthermore, when the management interface 1401 shown in FIG. 14 is linked to the warning statement 1302, and the user clicks on the warning statement 1302, the processor 212 of the management computer 201 may display the management interface 1401 shown in FIG. 14. The management interface 1401 enables the user to recognize the fact that there is a VVOL that does not meet the required performance.

The management interface 1401 may comprise a VVOL list 1402. When, for example, the SLO 1403 and the performance 1404 are displayed in the VVOL list 1402, the user is able to discern the performance of the VVOL that is not meeting the required performance and the extent to which this performance is not meeting the required performance.

<Virtual Volume Performance Management>

Figure 15:
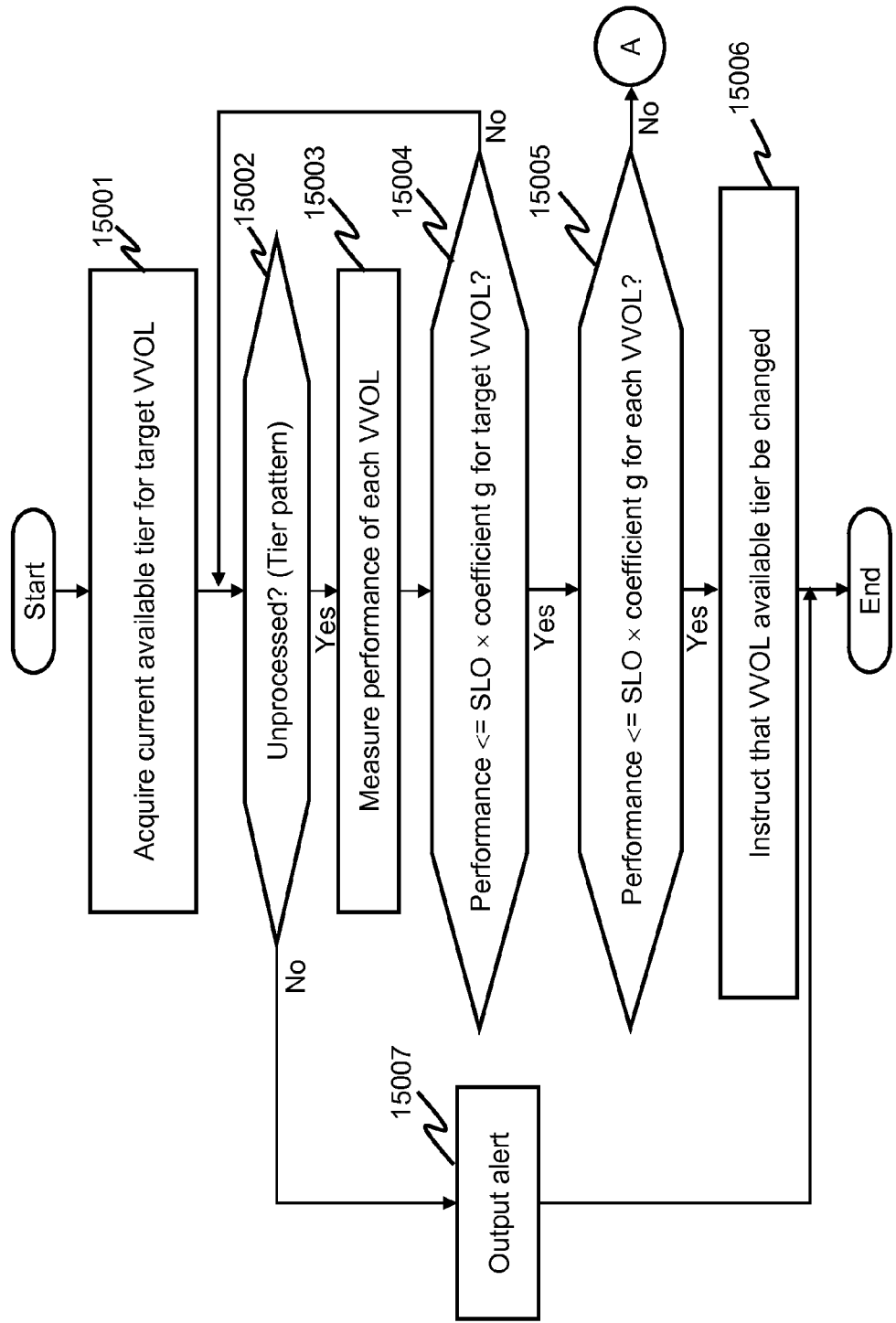
FIG. 15 is a portion of an example of a flowchart showing the flow of a VVOL performance management process related to the first example.
Figure 16:
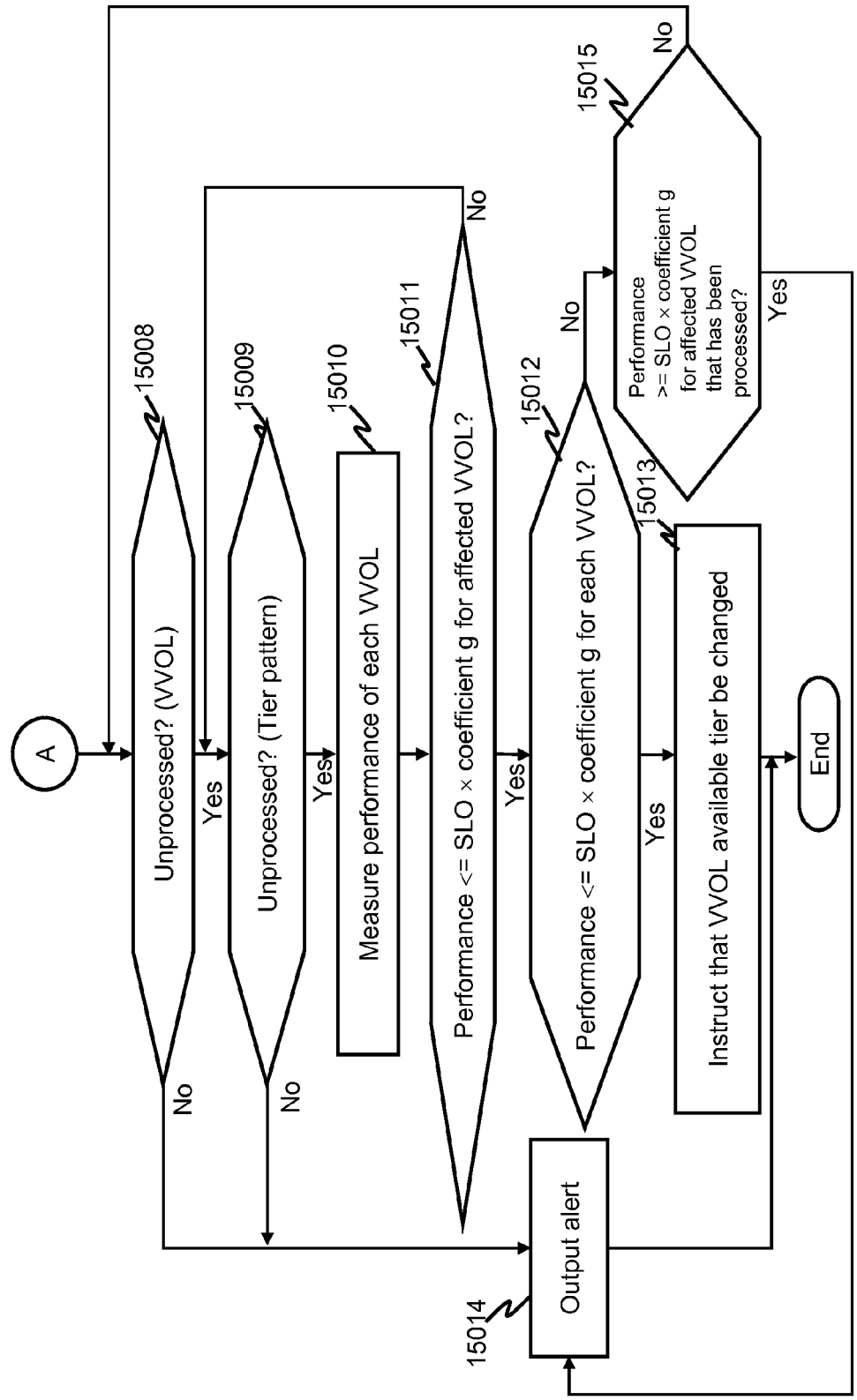
FIG. 16 is the remainder of the example of the flowchart showing the flow of a VVOL performance management process related to the first example.

FIGS. 15 and 16 are examples of flowcharts showing the flow of a VVOL performance management process.

For example, a VVOL performance management program 802 executes a VVOL performance management process when a VVOL performance adjustment instruction is received from the user. A VVOL performance adjustment instruction is executed by the user in a case where the user has discovered a VVOL that is not meeting the required performance in accordance with the VVOL status monitoring process (refer to FIG. 12). Additionally, the VVOL performance adjustment instruction may also be executed in a case where the VVOL performance management program 802 monitors the VVOL on a regular basis and a VVOL that does not meet the required performance is discovered. The VVOL performance adjustment instruction comprises the ID of the VVOL that is targeted for adjustment (hereinafter, referred to as target VVOL). The target VVOL is typically the VVOL that is not meeting the required performance.

The VVOL performance management program 802, based on the VVOL management table 804, identifies a tier that the target VVOL can use at the present point in time (S15001). Here, the tier that the target VVOL can use describes a tier shown in the available tier 706 column of the VOL management table 305.

Next, the VVOL performance management program 802, based on an available tier pattern that is capable of enhancing the performance of the target VVOL, determines whether or not there is a pattern that is not processed in S15003 below (S15002). Here, the "available tier pattern that is capable of enhancing the performance of the target VVOL", for example, is either of the below-listed patterns, which sequentially excludes a low-performance tier (in this case, either tier 3 or tier 2) in a case where the tiers acquired in S15001 were tier 1, tier 2 and tier 3.
(Pattern A) Tier 1, Tier 2
(Pattern B) Tier 1
That is, the "available tier pattern that is capable of enhancing the performance of the target VVOL" is the pattern that can be expected to enhance target VVOL performance in accordance with excluding a tier whose performance is lower than a certain criteria performance (in the above-mentioned example, the lowest performance tier 3, or the next lowest performance tier 2) from the default available tier (the pattern in which all the tiers are regarded as usable tiers).

When the tier that the target VVOL is able to use changes to either (Pattern A) or (Pattern B), the data stored in the page (s) inside tier 3 or tier 2 is reassigned to the high-performance high-level tier, making it possible to expect that target VVOL performance will be enhanced as a result.

In a case where the result of the determination of S15002 is negative, the VVOL performance management program 802 issues an alert and ends the processing (S15007). This is because performance cannot be expected to enhance to meet SLO even though the usable tier has changed. In accordance with this, it is necessary to carry out measures such as adding a high-performance media. The alert may include a message (for example, a message urging a media addition instruction) denoting a measure for meeting the SLO.

In a case where the result of the determination in the S15002 is affirmative, the VVOL performance management program 802 measures the performance (hereinafter, referred to as predicted performance) predicted for the target VVOL and each VVOL that shares the pool with the target VVOL by making one of the patterns determined in S15002 as not being implemented in S15003 the available tier of the target VVOL (S15003). At this point, the VVOL performance management program 802 measures the performance starting with the pattern that has the largest number of usable tiers. For example, an example of a case in which the tiers acquired in S15001 are tier 1, tier 2 and tier 3, and the performance-enhanceable patterns are the two patterns cited below will be explained.
(Pattern A) Tier 1, Tier 2
(Pattern B) Tier 1

There are two usable tiers in pattern A, and one usable tier in pattern B. In this case, the predicted performance is measured starting from pattern A. This is because a performance imbalance is more likely to occur the lower the number of usable tiers becomes. The larger the number of usable tiers the better, so long as the range meets the required performance.

As described hereinabove, there are times when changing the usable tier of the target VVOL to a high-level tier causes a page that had been assigned from the high-level tier prior to the change in a VVOL other than the target VVOL to drop to a lower level tier, raising the likelihood of a degradation of performance in the VVOL other than the target VVOL.

Next, the VVOL performance management program 802, based on a VVOL performance measurement management table 806, determines whether or not the predicted performance of the target VVOL is equal to or less than the product of the SLO and the coefficient g (S15004).

In a case where the result of the determination of S15004 is negative, the predicted performance of the target VVOL exceeds the product of the SLO and the coefficient g (that is, the response time that is predicted exceeds an allowable value). For this reason, the VVOL performance management program 802 once again carries out the processing of S15002. That is, the predicted performance of the target VVOL is measured once again based on a different available tier pattern.

In a case where the result of the determination in S15004 is affirmative, the response time predicted for the target VVOL is equal to or less than the allowable value. In this case, the VVOL performance management program 802, based on the VVOL performance measurement management table 806 (refer to FIG. 17), determines whether or not the predicted performance of the VVOL that shares the pool with the target VVOL is equal to or less than the product of the SLO and the coefficient g (S15005).

In a case where the result of the determination of S15005 is affirmative, the VVOL performance management program 802 sends the storage apparatus 203 an instruction to change the available tier of the target VVOL to the available tier assumed in the performance prediction of S15003, and ends the processing (S15006). The available tier change instruction comprises the target VVOL identifier and the available tier. The storage apparatus 203, which receives the available tier change instruction, uses the pool management program 301 to update the VOL management table and execute a page reassignment process. Furthermore, the page reassignment process may be executed promptly pursuant to receipt of the available tier change instruction, or may be executed at an arbitrary timing.

Alternatively, in a case where the result of the determination on S15005 is negative, as shown in FIG. 16, the VVOL performance management program 802 determines whether or not there is among the VVOL sharing the pool with the target VVOL a VVOL (hereinafter, affected VVOL) for which the processing of S15009 is not being carried out and which does not meet the required performance (S15008).

Figure 18:
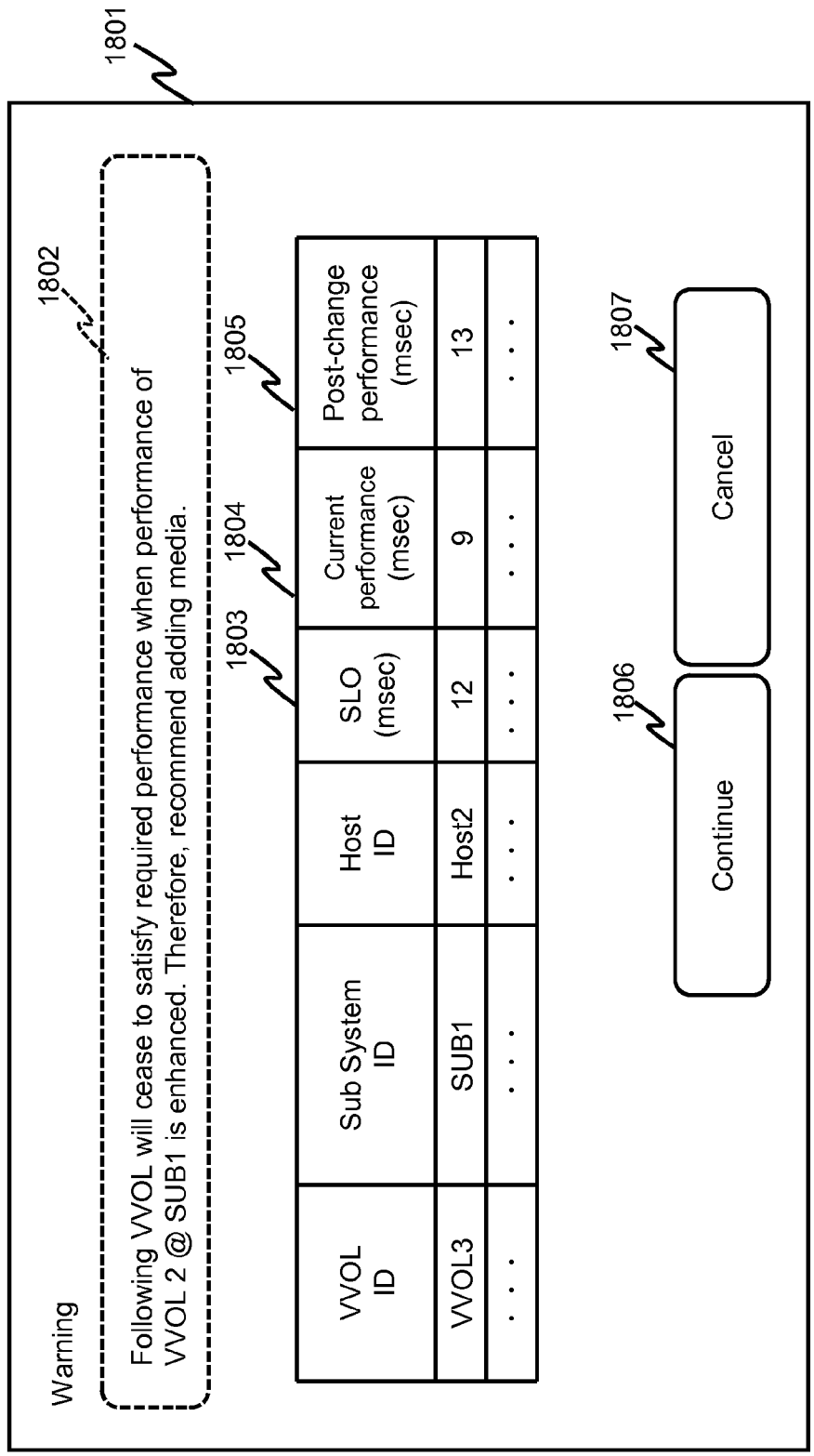
FIG. 18 shows an example of a VVOL performance degradation alert interface related to the first example.

In a case where the result of the determination of S15008 is negative, the VVOL performance management program 802 issues an alert and ends the processing (S15014). In this case, countermeasures such as adding a media must be taken to avoid the performance degradation of other VVOL sharing the pool with the target VVOL. For this reason, for example, a performance degradation warning interface 1801 shown in FIG. 18 may be displayed on the management computer. The performance degradation warning interface 1801, for example, may show a warning statement 1802 describing the extent to which the VVOL could become unable to meet the required performance in a case where a media is not added, and may display the following information in accordance with the VVOL performance measurement management table 806.

SLO 1803: The SLO of the VVOL (required performance).
Current performance 1804: Performance of VVOL prior to setting change.
Post-change 1805: Performance of VVOL after setting change.

The performance degradation warning interface 1801 may also comprise a setting button 1806 for continuing a setting even though there is a VVOL that will become unable to meet the required performance, and a cancel button 1807 for cancelling a setting. In a case where "Continue" has been selected, the same as in S15013, which will be described further below, the VVOL performance management program 802 instructs the storage apparatus 203 to change the tier to be used and ends the processing (omitted from the drawing). Alternatively, in a case where "Cancel" has been selected, the VVOL performance management program 802 cancels the setting (omitted from the drawing).

In a case where the result of the determination of S15008 is affirmative, the VVOL performance management program 802 determines whether or not the available tier patterns capable of enhancing the performance of the affected VVOL include a pattern that is not processed in S15010 (S15009).

In a case where the result of the determination on S15009 is negative, the VVOL performance management program 802 issues an alert and ends the processing (S15014). Furthermore, this alert may also be notified via the performance degradation warning interface 1802.

In a case where the result of the determination of S15009 is affirmative, the VVOL performance management program 802 selects any pattern in which S15010 does not process the available tier of the affected VVOL in the available tier pattern capable of enhancing the performance of the affected VVOL, and in a case where it is assumed that this selected pattern is the available tier of the affected VVOL, measures the predicted performance of the affected VVOL and the other VVOLs sharing the pool with the affected VVOL (S15010). Here, too, the VVOL performance management program 802 measures the predicted performance starting from the pattern having the largest number of usable tiers the same as in S15003.

The VVOL performance management program 802, based on the VVOL performance measurement management table 806 (refer to FIG. 17), determines whether or not the predicted performance of the affected VVOL is equal to or less than the product of the SLO and the coefficient g (S15011).

In a case where the result of the determination of S15011 is negative, the processing of S15009 is carried out once again.

In a case where the result of the determination of S15011 is affirmative, the VVOL performance management program 802 determines whether or not the predicted performance of the VVOL (includes the target VVOL) sharing the pool with the affected VVOL is equal to or less than the product of the SLO and the coefficient g based on the VVOL performance measurement management table 806 (S15012).

In a case where the result of the determination of S15012 is affirmative, the VVOL performance management program 802, based on the VVOL performance measurement management table 806, sends the storage apparatus 203 an instruction to change the available tier, and ends the processing (S15013). The available tier change instruction comprises the target VVOL, the identifier of the affected VVOL, which is the target of the available tier change, and the post-change available tier of each VVOL. The storage apparatus 203, which receives the available tier change instruction, executes a page reassignment process in accordance with the pool management program 301.

In a case where the result of the determination of S15012 is negative, the VVOL performance management program 802 determines whether or not there is among the multiple VVOLs sharing the pool with the affected VVOL a VVOL for which the predicted performance is larger than the product of the SLO and the coefficient g for at least one of the processed affected VVOLs and the target VVOL (S15015). That is, a check is carried out here as to whether or not changing the available tier of the affected VVOL has had an adverse affect on the processed affected VVOLs (the VVOL that was the previous affected VVOL) and the target VVOL.

In a case where the result of the determination of S15015 is affirmative, the VVOL performance management program 802 issues an alert and ends the processing (S15014).

In a case where the result of the determination of S15015 is negative, the processing of S15008 is carried out once again.

In accordance with the VVOL performance management process described hereinabove, even when the target VVOL is not meeting the required performance, the target VVOL can be made to meet the required performance by changing the available tier of the target VVOL. At this time, changing the available tier not only for the target VVOL but also for the other VVOL sharing the pool with the target VVOL makes it possible for each of the multiple VVOLs sharing this pool to meet the required performance.

Furthermore, the processing for the VVOL, which is selected in S15008 and for which the processing of S15009 and thereafter is carried out, may be executed based on the priority of the VVOL that is to be made to meet the required performance, i.e., may be carried out from a VVOL with a high required performance, or may be carried out from a VVOL for which the deviation between the required performance and the predicted performance increases pursuant to changing the available tier of the target VVOL.

The VVOL performance management process may be carried out when the user discovers a VVOL that does not meet the required performance as described hereinabove, and the user instructs that the performance be adjusted, and additionally, for example, may be carried out when the user changes the required performance of the VVOL. In this case, the VVOL performance management program 802 receives a VVOL required performance change instruction from the user. The VVOL required performance change instruction comprises the SLO and so forth of the VVOL. The VVOL performance management program 802 executes the processing of S15001 and thereafter in response to the VVOL required performance change instruction.

FIG. 17 shows an example of the VVOL performance measurement management table 806.

The measurement of the performance of each VVOL explained using S15003 will be explained in detail below. Specifically, giving a single available tier pattern as an example, the following processing is carried out.

(j1) The VVOL performance management program 802 prepares the table 806 shown in FIG. 17 in the storage resource 211 inside the management computer 201. The table 806 comprises the following information for target VVOL and each VVOL sharing the pool with the target VVOL.

A VVOL ID 1701: Information for identifying a VVOL.
    An access distribution 1702: The same information as that of the VVOL access distribution 910 (refer to FIG. 9).
    A total 1703: Information showing the total number of pages (used pages) assigned to the VVOL.
    Media ratios 1704: Information showing the percentage of the total number of used pages for each tier with respect to the total 1703.
    A performance 1705: The same information as that of the VVOL performance 909 (refer to FIG. 9).
    A SLO 1706: The same information as that of the SLO 905 associated with the VVOL (Refer to FIG. 9).
    Available tier (Pre-change) 1707: Information showing the pre-change available tier for the VVOL.
    Available tier (Post-change) 1708: Information showing the post-change available tier for the VVOL.

(j2) The VVOL performance management program 802 distributes the page groups of each tier in the pool used by the target VVOL in accordance with the total number of used pages for each access frequency range. In so doing, the program 802, after preferentially assigning a page of the VVOL for which the priority tier pattern is specified as the available tier, carries out an assignment, which corresponds to the access frequency range. Specifically, for example, it is supposed that the pool comprises three tiers, and the number of pages configuring tier 1 (high-level tier) is 30000,
    the number of pages configuring tier 2 (mid-level tier) is 400000, and
    the number of pages configuring tier 3 (low-level tier) is 500000.

(j2-1) First, the program 802 assigns data, which is inside the page of the VVOL for which tier 1 is the priority tier pattern, to tier 1. In the example of FIG. 17, the VVOL for which tier 1 is the priority tier pattern is "VVOL 2". In accordance with this, first the program 802 preferentially assigns pages from tier 1 to the VVOL 2. Then, in a case where pages remain in tier 1 even though pages have been assigned from tier 1 to the VVOL 2, the program 802 distributes these remaining pages to the respective VVOL other than the VVOL 2 based on the access frequency of each VVOL.

(j2-2) It is assumed that the 15000 pages worth of data assigned to the VVOL 2 is stored in tier 1. In the example of FIG. 17, since the tier 1 priority tier pattern is not specified for a VVOL other than the VVOL 2, the remaining pages in tier 1 (30000−15000=15000 pages) are distributed based on access frequency with respect to the pages of the VVOL for which tier 1 is included in the available tier.

(j2-3) In the example of FIG. 17, distributing of the pages of VVOL 1 and VVOL 3 is carried out. For example, in a case where the total number of pages in the first high access frequency range "equal to or greater than 2500" is 5000 pages, it is assumed that the data within the 5000 pages of the access frequency belonging to the access frequency range "equal to or greater than 2500" is stored in the 5000 pages of the 15000 pages remaining in tier 1. In a case where the total number of used pages in the second high access frequency range "equal to or greater than 2250 but equal to or less than 2449" is 12000 pages, it is assumed that the data within 10000 pages of the 12000 pages of the access frequency belonging to the access frequency range "equal to or greater than 2250 but equal to or less than 2449" is stored in the pages (30000−15000−5000=10000 pages) remaining in tier 1. This completes the distributing of pages to tier 1.

(j2-4) Next, the program 802 assigns a page of the VVOL for which tier 2 is the priority tier pattern to tier 2. In the example of FIG. 17, the VVOL for which tier 1 and tier 2, which are the tier 2 priority tier pattern, are regarded as the available tier, is "VVOL 1". For this reason, first, a page of the pages assigned to VVOL 1 for which the page distribution to tier 1 was not carried out, is assigned to tier 2.

(j2-5) Then, in the example of FIG. 17, since the tier priority tier pattern is not specified for a VVOL other than the VVOL 1, the remaining pages in tier 2 are distributed based on access frequency with respect to the pages of the VVOL for which tier 2 is included in the available tier. When the distribution to tier 2 has been completed, the same processing is carried out for tier 3.

(j3) The VVOL performance management program 802 updates the media ratios 1704 for VVOLs 1 through 3 based on the result of the above-described (j2). The post-update value is shown in FIG. 17 after the "→" sign.

(j4) The VVOL performance management program 802 computes the performance 1705 for the VVOLs 1 through 3 based on the post-update media ratios 1704 in a case where it is assumed that the usable tier of the target VVOL has been changed. The value of this performance 1705 is shown in FIG. 17 after the "→" sign.

According to the first example above, in a case where either a performance adjustment or a required performance change has been instructed with respect to a certain VVOL, the required performance of multiple VVOLs can be enhanced by changing not only the available tier of the VVOL for which the performance adjustment or required performance change was instructed, but also the available tier of the VVOL sharing the pool with this VVOL.

Example 2

First, an overview of a second example of the present invention will be explained.

In a storage apparatus in which thin provisioning technology and data reassignment technology have been applied, when a specific tier is preferentially assigned to a certain VVOL, the pages of this specific tier become depleted. When this happens, there are cases in which it becomes impossible for a page to be assigned from the specific tier to another VVOL sharing the pool with this VVOL. In a case where the specific tier is a high-level tier, it may become impossible to assign a page from the high-level tier to the other VVOL. As a result, the other VVOL become unable to meet the performance that is required of them.

The performance of a VVOL can be rebalanced in accordance with executing a page reassignment process, but since the page reassignment process puts a load on the storage apparatus, it is preferable that pages be assigned from the beginning without a page reassignment process occurring.

In this example, the time at which pages will be depleted is predicted for all tiers comprising a pool that is shared by multiple VVOLs. Then, with respect to a depleted tier, which is a tier for which a depletion point in time (depletion time) is sooner than a stipulated point in time (stipulated time), the available tier is configured using the remaining tiers, which exclude this depleted tier, for each VVOL such that all the VVOLs sharing the pool meet the required performance.

The second example will be explained in detail below by referring to the drawings. In so doing, the points of difference with the first example will mainly be explained, and explanations of the points in common with the first example will be simplified or omitted.

Since the configurations of the host computer 101, the storage apparatus 203, and the management computer 201 in the second example are the same as in the first example, explanations will be omitted.

Figure 19:
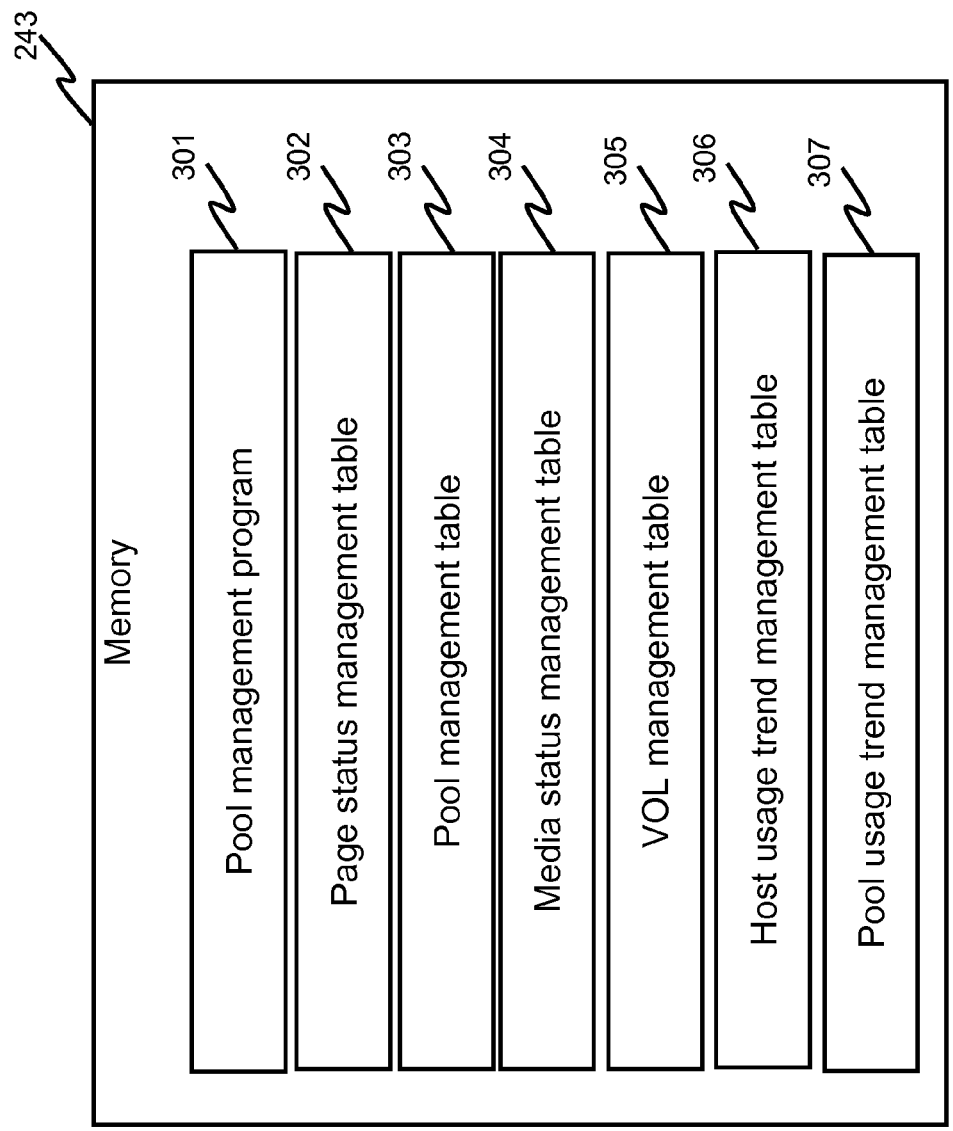
FIG. 19 shows examples of the programs and information stored in the memory 243 of the controller 251 related to a second example.

FIG. 19 shows examples of a program and information stored in the memory 243 inside the controller 251.

A pool management program 301 is stored as the program. A page status management table 302, a pool management table 303, a media status management table 304, a VOL management table 305, a host usage trend management table 306, and a pool usage trend management table 307 are stored as the information.

The page status management table 302, the pool management table 303, and the media status management table 304 are the same as in the first example, and as such, explanations will be omitted. The pool management program 301 is executed by the processor 244 and realizes processing, which will be described further below, based on the above-mentioned tables 302 through 307.

FIG. 20 shows an example of a VOL management table 305.

The VOL management table 305 comprises information related to volumes of the storage apparatus 203. This table 305 adds the information of a candidate tier 707 to the table shown in FIG. 7. The candidate tier 707 is information showing a tier candidate that is capable of assigning a page to the VVOL. A tier specified in the available tier 706 is selected from among the tiers registered in the candidate tier 707.

FIG. 21 shows an example of a host usage trend management table 306.

The host usage trend management table 306 comprises information related to usage trends for all the VVOLs of the storage apparatus 203. Specifically, for example, the host usage trend management table 306 comprises the following information.

A host ID 2104: Information for identifying a host computer.
A tier 2105: Information for identifying a tier.
A time 2106: Information showing a measurement time slot during which a tier usage trend is measured.
A new used capacity 2107: Information showing the total capacity of pages newly assigned to the host computer 101 (the host computer identified from the corresponding host ID 2104) during the measurement time slot.
A used capacity during measurement 2108: Information, which shows the total capacity of pages assigned to the host computer 101 (the host computer identified from the corresponding host ID 2104) during the measurement time slot, and which is updated when measurement is in progress.

In the example of FIG. 21, a breakdown of the page groups newly assigned to VVOL 1 during time slot "10:00 to 11:00" shows a 5 GB page group from tier 1 and a 2 GB page group from tier 2. Also, "11:00 to 12:00" is the time slot during which measurement is in progress, and the sum of the capacity obtained in accordance with the previous measurement and the capacity measured up to the present point in time is recorded in the new used capacity 2107. The newly assigned capacity that occurred during measurement is recorded in the used capacity during measurement 2108, and in the example of FIG. 21, it is clear that 1 GB worth of page groups were assigned from tier 1, and that no new assignments were made from tier 2.

According to table 305 of FIG. 20 and table 306 of FIG. 21, it is clear how many page groups were assigned from which tiers during which time slot to the one or more VVOL being used by the host computer 1. This makes it is possible to predict the tier usage trends of the host computer 1.

FIG. 22 shows an example of the pool usage trend management table 307.

The pool usage trend management table 307 comprises information related to the usage trends of the pools of the storage apparatus 203. Specifically, for example, the pool usage trend management table 307 comprises the following information for each pool.

A pool ID 2201: Information for identifying a pool.
A tier ID 2202: Information for identifying a tier in a pool.
A time 2203: Information showing a measurement time slot.
A new used capacity 2204: Information showing the total capacity of the pages newly assigned during the measurement time slot.
A used capacity during measurement 2205: Information, which shows the total capacity of the pages newly assigned during the measurement time slot, and which is updated when the measurement is in progress.
A free capacity 2206: Information showing the free capacity of a tier (the total capacity of unused pages).

Refer to FIG. 19 once again.

The pool management program 301, for example, carries out the following processing based on the tables 302 through 307 described hereinabove.

(q) The pool management program 301 can carry out a write process comprising the processes (q1) through (q9) below. The differences with the first example are the fact that
the new used capacity during measurement (2108, 2205) of the host usage trend management table 306 and the pool usage trend management table 307 are updated each time a new page assignment is generated in line with a write, and
a tier, which is regarded as the available tier 706, is decided from among the candidate tiers 707 of the VVOL management table 305.

This processing will be explained in detail.

(q1) The pool management program 301 receives a write command from the host computer 101.
(q2) The program. 301 identifies the write-destination VVOL and the write-destination virtual area based on the access destination information of the write command.
(q3) The program 301 stores write-target data conforming to the write command in the cache memory area. The program 301 may respond to the host computer 101 that the write is complete.
(q4) The program 301 determines whether a page is assigned to the write-destination virtual area identified in the (q2) above based on the page status management table 302 (or the above-mentioned mapping management table).
(q5) In a case where the result of the determination of the above (q4) is affirmative, the program 301 writes the write-target data inside the cache memory area to the page assigned to the write-destination virtual area.
(q6) In a case where the result of the determination of the above (q4) is negative, the program 301 identifies a tier capable of being used by the write-destination VVOL from among the tiers recorded in the available tier 706 of the VOL management table 305. Then, the pool management program 301, based on the VOL management table 305, the page status management table 302, the pool management table 303, and the media status management table 304, identifies unused pages (pages not assigned to any virtual area) belonging to the tier capable of being used by the write-destination VVOL from within the pool associated with the write-destination VVOL. At this point, the program 301, based on the media status management table 304, may identify an unused page from the media belonging to the highest level tier possible among the tiers capable of being assigned to the write-destination VVOL.

(q7) The program 301 associates the pages identified in the (q6) above with the write-destination virtual area. Specifically, for example, the program 301 writes the start LBA and the end LBA of the write-destination virtual area to the pool management table 303 as the VVOL LBA 506 corresponding to the assigned pages.

(q8) The program 301 writes the write-target data inside the cache memory area to the pages identified in the (q6) above (the program 301 may respond to the host computer 101 at this stage that the write is complete).

(q9) The program 301 updates the last access time 404 and the access frequency 405 of the data write-target page in the page status management table 302 in either (q5) or (q8) above. In line with this, the program 301 also updates the access frequency 605 of the media comprising this page in the media status management table 304. In addition, the program 301 updates the used capacity during measurement 2108, 2206 and the free capacity 2206 for the time slot in which the write occurred in the host usage trend management table 306 and the pool usage trend management table 307. Specifically, the program 301, based on the VOL management table 305, identifies the host computer to which the write-destination VVOL is assigned and the pool that this VVOL uses, identifies the record of the host usage trend management table 306 based on the host ID, the tier to which the page identified in (q6) belongs, and the write time slot, and, in addition, identifies the record of the pool usage trend management table 307 based on the ID of the pool used by the VVOL, the tier to which the page identified in (q6) belongs, and the write time slot. Then, the program 301 records the result obtained by adding the total capacity of the pages newly assigned in accordance with the relevant write and the capacity registered in the used capacity during measurement 2108, 2206 in the used capacity during measurement 2108, 2206 of the host usage trend management table 306 and the pool usage trend management table 307.

(p) The pool management program 301 can carry out a new used capacity determination process, which comprises the processes (p1) through (p2) below. The new used capacity determination process, for example, is executed at the time when the time slot for measuring usage trends changes. In the examples of FIGS. 21 and 22, the measuring time slot changes at 11:00, 12:00, 13:00, . . . , and as such, the used capacity determination process is executed at these times.

(p1) The pool management program 301, with respect to the host usage trend management table 306 and the pool usage trend management table 307, acquires the capacity information registered in the used capacity during measurement columns 2108, 2205 of the time slots for which measurement has been completed, and overwrites this capacity information as the new used capacity 2107, 2204 in the same records. Furthermore, the new used capacity 2107, 2204 is not simply overwritten using the latest measurement information, but rather may be overwritten using a value weighted with measurement information acquired in the past.

(p2) The pool management program 301 initializes the used capacity during measurement for the time slots for which measurements have been completed. For example, in the case of a used capacity determination process implemented at 12:00, the program 301 updates the new used capacity 2107, 2204 of the same records using the capacity information registered in the used capacity during measurement of the "11:00 to 12:00" time slot. Then, the program 301 initializes the used capacity during measurement 2108, 2205 of the "11:00 to 12:00" time slot using for example 0 GB.

Figure 23:
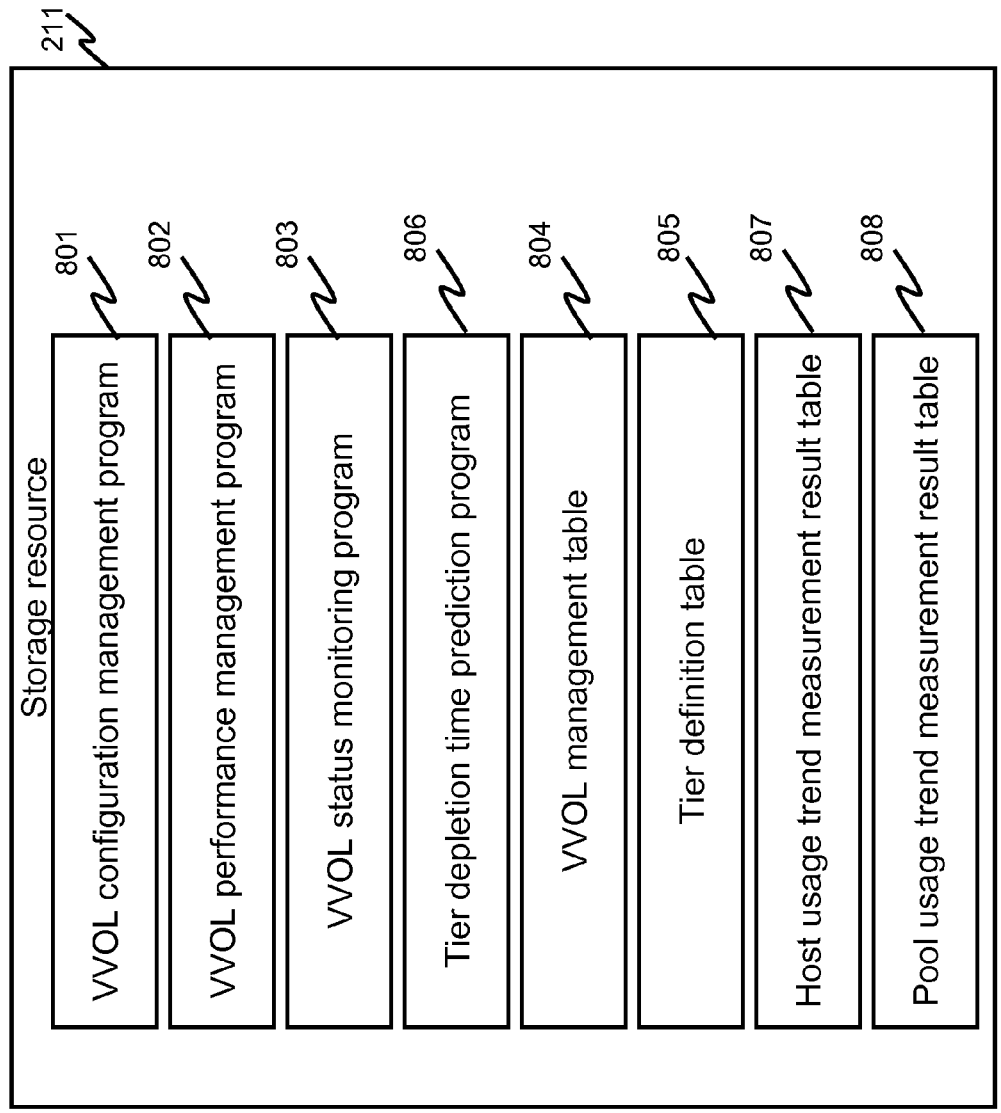
FIG. 23 shows examples of programs and information stored in the memory of the management computer 201 related to the second example.

FIG. 23 shows examples of programs and information stored in the storage resource 211 inside the management computer 201.

A VVOL configuration management program 801, a VVOL performance management program 802, a VVOL status monitoring program 803, and a tier depletion time prediction program 806 are stored as the programs. A VVOL management table 804, a tier definition table 805, a host usage trend measurement result table 807, and a pool usage trend measurement result table 808 are stored as the information. This drawing adds a host usage trend measurement result table 807 and a pool usage trend measurement result table 808 to FIG. 8. The tier definition table 805 is the same as that of the first example, and as such, an explanation will be omitted.

FIGS. 24 and 25 show examples of the VVOL management table 804.

The VVOL management table 804 comprises information related to the VVOL. The difference between this table 804 and the table 804 shown in FIG. 9 is the fact that this table 804 comprises a candidate tier 911 for each VVOL. The candidate tier 911 is information showing candidates for a tier capable of assigning pages to the VVOL.

FIG. 26 shows an example of the host usage trend measurement result table 807.

The host usage trend measurement result table 807 is managed by the management computer 201. The host usage trend measurement result table 807 stores information denoting pool usage trends measured for each host computer.

Specifically, for example, the host usage trend measurement result table 807 comprised the following information for each host computer 101.

A host ID 2601: Information for identifying a host computer 101.
 A subsystem ID 2602: Information for identifying a storage apparatus 203.
 A tier ID 2603: Information for identifying a tier.
 A time 2604: Information showing a measurement time slot.
 A new used capacity 2605: Information showing the total capacity of pages newly assigned during the above-mentioned time slot.

FIG. 27 shows an example of the pool usage trend measurement result table 808.

The pool usage trend measurement result table 808 stores information denoting the measured usage trends of the pools.

Specifically, for example, this table 808 comprises the following information for each pool.

A pool ID 2701: Information for identifying a pool.
 A subsystem ID 2702: Information for identifying a storage apparatus 203 comprising a pool.
 A tier 2703: Information for identifying a tier.
 A time 2704: Information showing a measurement time slot.

A new used capacity 2705: Information showing the total capacity of pages newly assigned during the above-mentioned time slot.

A free capacity 2706: Information showing the free capacity of a tier.

The processing carried out by the second example will be explained in detail below. Furthermore, virtual volume creation, assignment management, a virtual volume status monitoring process and a virtual volume performance management process are the same as those in the first example, and as such, explanations will be omitted.

<Tier Depletion Time Prediction Management>

Figure 28:
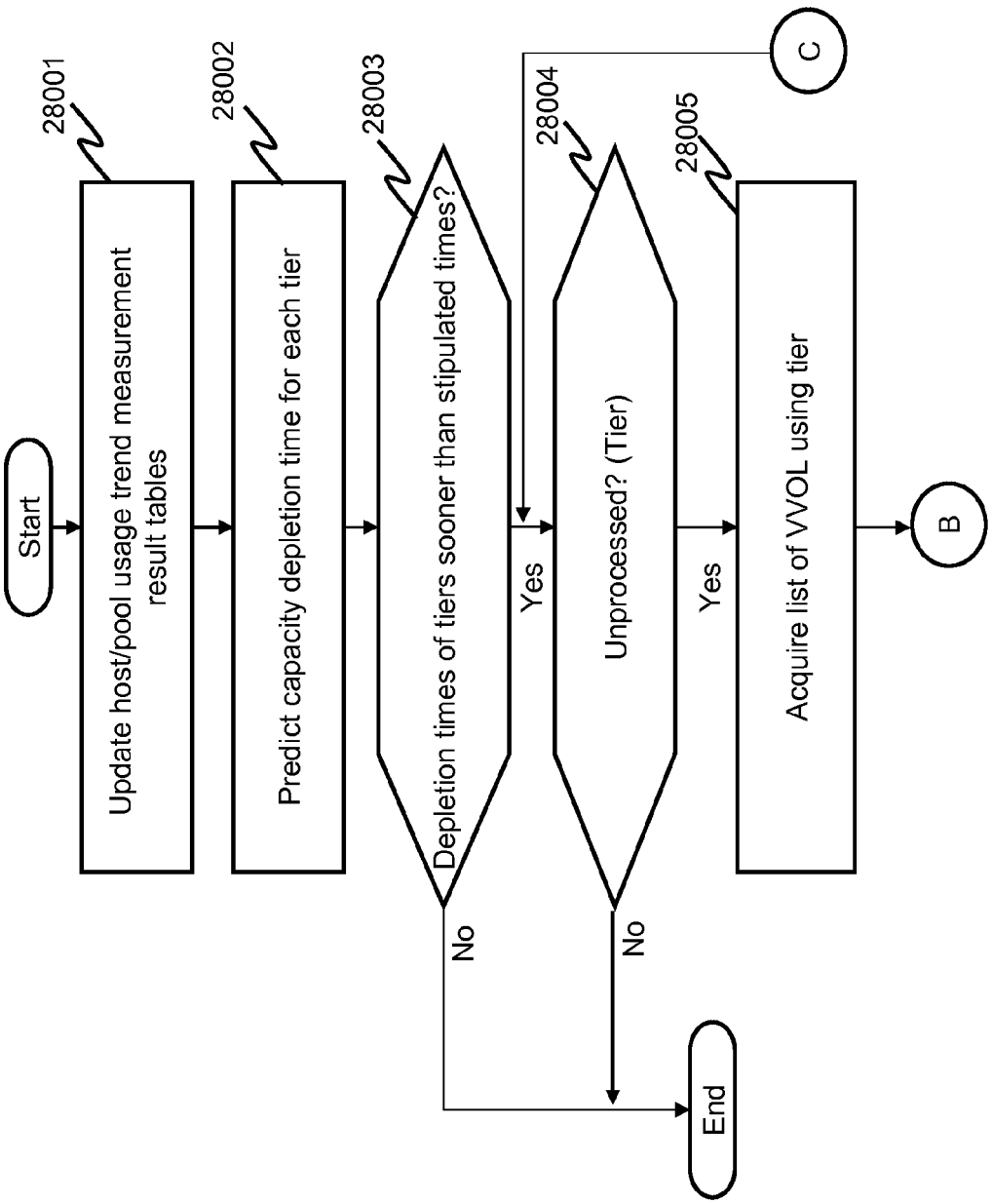
FIG. 28 is a portion of an example of a flowchart showing the flow of a tier depletion time prediction management process related to the second example.
Figure 29:
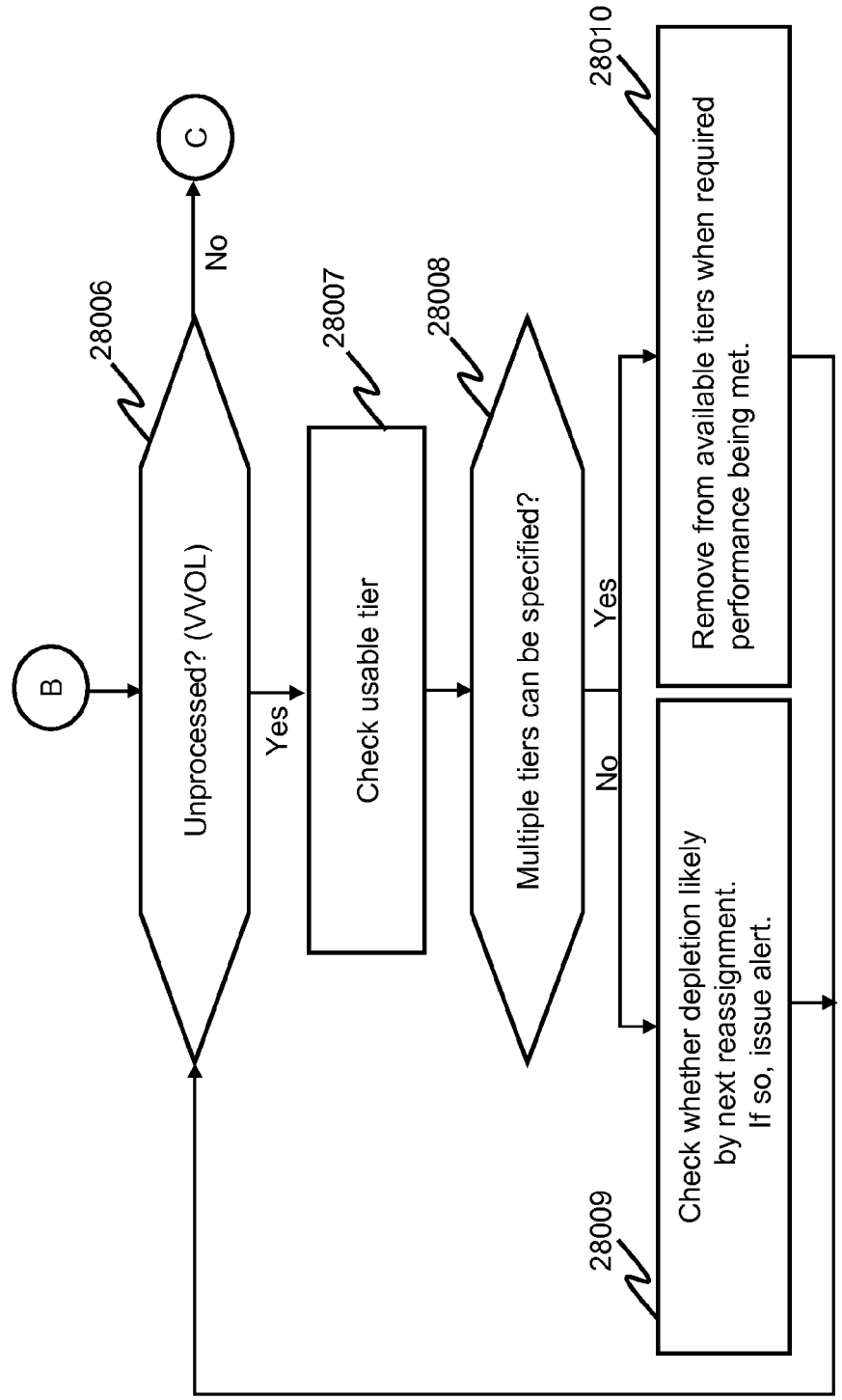
FIG. 29 is the remainder of the example of the flowchart showing the flow of the tier depletion time prediction management process related to the second example.

FIGS. 28 and 29 are examples of flowcharts showing the flow of a tier depletion time prediction management process related to the second example.

For example, the tier depletion time prediction process may be carried out as post-processing with respect to the page reassignment process of the first example, or may be carried out at an arbitrary timing.

The tier depletion time prediction program 806 sends the storage apparatus 203 a request to acquire host/pool usage trend measurement results, receives the information recorded in the host usage trend management table 306 and the pool usage trend management table 307, and, based on this information, updates the host usage trend measurement result table 807 and the pool usage trend measurement result table 808 (S28001).

The prediction program 806 predicts the depletion time of each tier based on the pool usage trend measurement result table 808 (S28002). The example of tier 1 in FIG. 27 shows that 10+8+1+10=29 GB worth of new page assignments were generated during the four hours from 10:00 to 14:00. Supposing that the current time is 10:00, it is predicted that the 20 GB worth of free capacity will all be used up and that the capacity of tier 1 could be depleted within three to four hours from the current time. That is, the time slot between three and four hours after the current time is the depletion time.

The prediction program 806 determines whether or not the depletion time of each tier obtained in S28002 is sooner than the stipulated time (S28003).

In a case where the result of the determination of S28003 is negative, the prediction program 806 ends the processing.

In a case where the result of the determination of S28003 is affirmative, the prediction program 806 determines whether or not, of the tiers comprising the pool, there is a tier among the tiers whose depletion time is sooner than the stipulated time in S28003 for which S28005 is not carried out (S28004).

In a case where the result of the determination of S28004 is negative, the prediction program 806 ends the processing.

In a case where the result of the determination of S28004 is affirmative, the prediction program 806, based on the VVOL management table 804, identifies the VVOL using this tier from the tiers with fast depletion times (S28005).

The prediction program 806 determines whether or not there is a VVOL among the VVOL identified in S28005 for which S28007 is not carried out (S28006).

In a case where the result of the determination of S28006 is negative, the prediction program 806 executes S28004 once again.

In a case where the result of the determination of S28006 is affirmative, the prediction program 806 acquires the VVOL usable tier identified in S28006 based on the VVOL management table 804 (S28007).

The prediction program 806 determines from the usable tier acquired in S28007 whether or not this VVOL can use multiple tiers (S28008).

In a case where the result of the determination of S28008 is negative, the prediction program 806 determines, based on the host usage trend management table 807, whether or not this tier will be depleted by the next reassignment, and in a case where depletion is likely, notifies the user of an alert and returns to the processing of S28006 (S28009).

In a case where the result of the determination of S28008 is affirmative, the prediction program 806 determines whether the required performance will be met in a state in which the tier selected in S28004 has been removed from the available tiers of this VVOL, and in a case where the required performance can be met, removes the tier selected in S28004 from the available tiers. Whether the required performance is capable of being met can be determined in accordance with the same method as the "predicted performance measurement" explained with respect to the VVOL performance management process in the first example.

When the tier selected in S28004 has been removed and it is clear that the required performance can be met, the prediction program 806 excludes the tier processed in S28004 from the tiers recorded in the available tier column 906 of the VVOL management table 804 (S28010).

The above-described processing is carried out for all the VVOLs that share a single pool. For this reason, the required performance of all the VVOLs can be expected to be met while preventing a tier that is likely to become depleted from being used.

Furthermore, in the processing described above, a check is made as to whether or not the multiple tiers in S28008 can be specified for the VVOL selected in S28006, and in a case where the determination of S28008 is negative, and, in addition, depletion is likely by the next reassignment, an alert is displayed, but an alert may be displayed only in a case where S28007 and S28008 are carried out for all the VVOLs acquired in S28005, and tier capacity is also likely to become depleted. Of the VVOL acquired in S28005, the VVOL from which the processing of S28007 is to be carried out may be decided randomly, or may be decided in accordance with a prescribed policy.

Furthermore, the processing of S28010 can be divided into the following two steps:

(Step 1) Even though the prediction program 806 has removed the tier for which the predicted depletion time is sooner than the stipulated time from the available tiers, notification of this fact is made to the user at the point in time when it has become clear that the required performance of all the VVOLs sharing the single pool will be met; and (Step 2) The user removes the fast depletion time tier from the available tiers when permitted.

Figure 30:
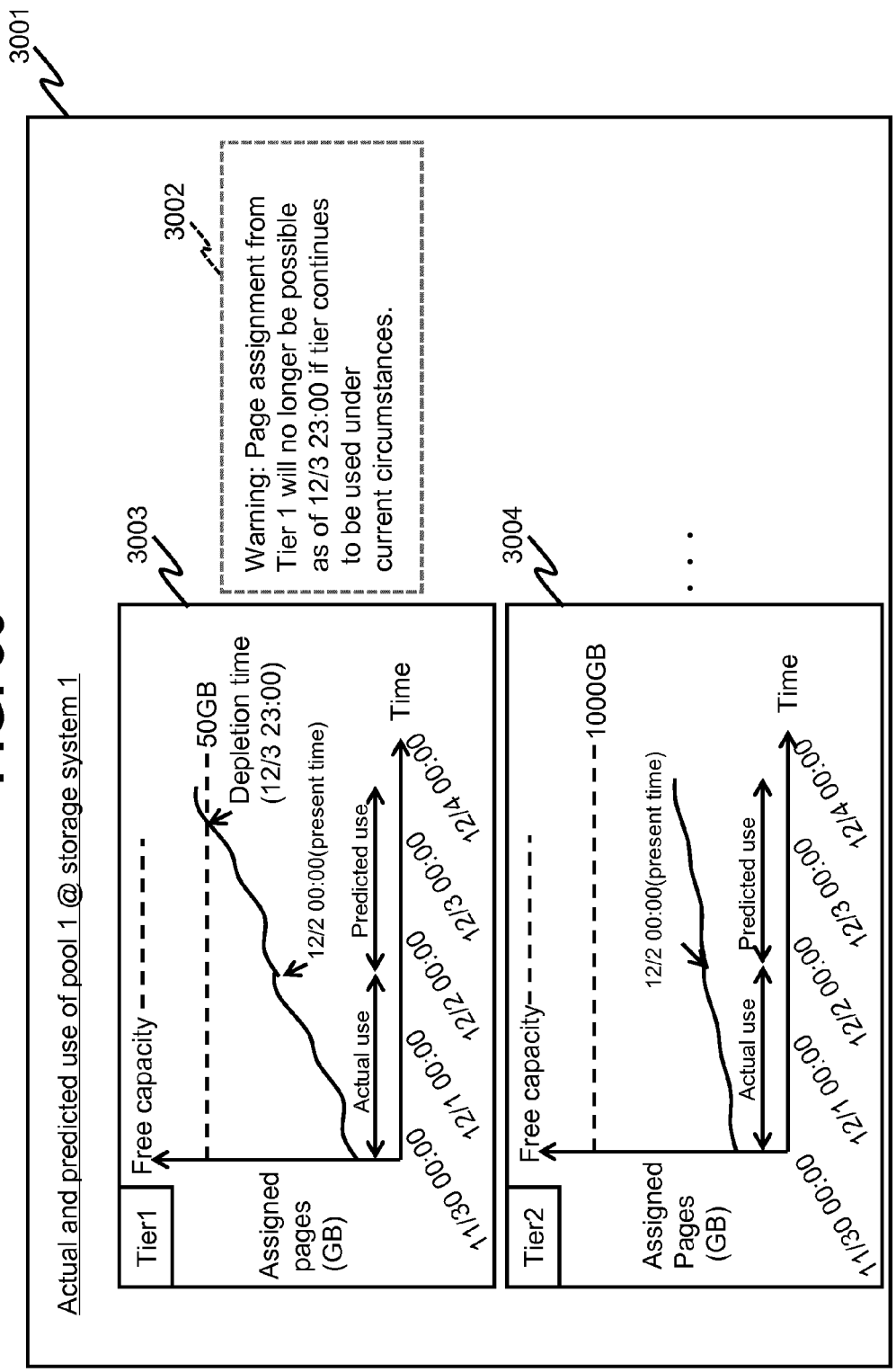
FIG. 30 shows an example of a pool utilization status interface 3001 related to the second example.

FIG. 30 shows an example of a pool utilization status interface 3001.

This interface 3001 is an example of a screen (for example, a GUI) for notifying the user of the status of pool utilization, and may be displayed in accordance with an instruction from the user, or may be included in the alert of S28009 of the tier depletion time prediction management process and displayed on the management computer.

The interface 3001 is for notifying the user of the actual utilization and the depletion time prediction result of each tier comprising the pool. A warning statement 3002 and graphs 3003 and 3004 denoting the actual utilization of tier 1 and tier 2 are displayed in the interface 3001.

The graphs 3003 and 3004 are displayed on the basis of the pool usage trend measurement result table 808. For example, at the present time, unused pages exist in tier 1, but in a case where tier 1 continues to be used as-is, there is the likelihood of the unused pages running out at 12/3/23:00. The warning statement 3002 includes a message notifying the user of this fact.

For example, in a case where a new VVOL is to be added at this point in time (12/3/23:00), there is the likelihood that pages will not be able to be assigned to the new VVOL from tier 1. Alternatively, it is clear that there is no possibility of the tier 2 pages becoming depleted at this point in time (12/3/23: 00). In accordance with this, the assignment of pages from tier 1 to all the VVOLs is suspended such that the required performance of all the VVOLs sharing a single pool is met.

According to the second example above, it is possible to prevent depletion biased toward only pages of a specified tier by limiting the usable tiers to an extent that meets the required performance of all the VVOLs sharing a single pool. In accordance with this, when a new VVOL for which pages are to be preferentially assigned from tier 1 is to be added, for example, it is possible to prevent for a fixed period of time a situation in which tier 1 becomes depleted and pages are unable to be assigned from tier 1 to the new VVOL.

Example 3

An overview of a third example of the present invention will be explained first.

In a storage apparatus 203 in which thin provisioning technology and data reassignment technology have been applied, normally, pages are often assigned to an existing VVOL from the high-level tier as long as there are free pages in the high-level tier. This kind of page assignment method can be expected to enhance the I/O performance of the existing VVOL as much as possible. However, according to this method, when all the pages of the high-level tier are assigned to the existing VVOL even though a new VVOL is to be added afterwards, it becomes impossible to assign pages from the high-level tier to a VVOL that is added afterwards.

Consequently, in this example, in a storage apparatus 203 in which multiple VVOLs share a single pool, in a case where the time at which a VVOL is to be added and the pool usage trends of this VVOL are known beforehand, the following processing is carried out primarily in preparation for adding this VVOL.

The point in time (time) when pages will be depleted is predicted for each tier based on the time that a new VVOL is to be added and the pool usage trends. With respect to a depleted tier, which is a tier for which the depletion time is sooner than the stipulated time, the depleted tier is removed from the available tiers of each VVOL such that the required performance of the VVOL using the pool comprising the depleted tier is met. Carrying out this kind of processing for each VVOL sharing a single pool makes it possible for multiple VVOLs to meet the required performance.

The third example will be explained in detail below by referring to the drawings. In so doing, the points of difference with the first and second examples will primarily be explained, and explanations of the points in common with the first and second examples will be simplified or omitted.

In the third example, since the configurations of the storage system 103, the host computer 101, the storage apparatus 203, and the management computer 201 are the same as in the first and second examples, explanations will be omitted.

Also, since the programs and information stored in the memory 243 inside the controller 251 in the third example are the same as those of the second example, explanations will be omitted.

Furthermore, in the third example, since the programs and information stored in the storage resource 211 inside the management computer 201 are the same as those of the second example, explanations will be omitted.

<Tier Depletion Time Prediction Management>

Figure 31:
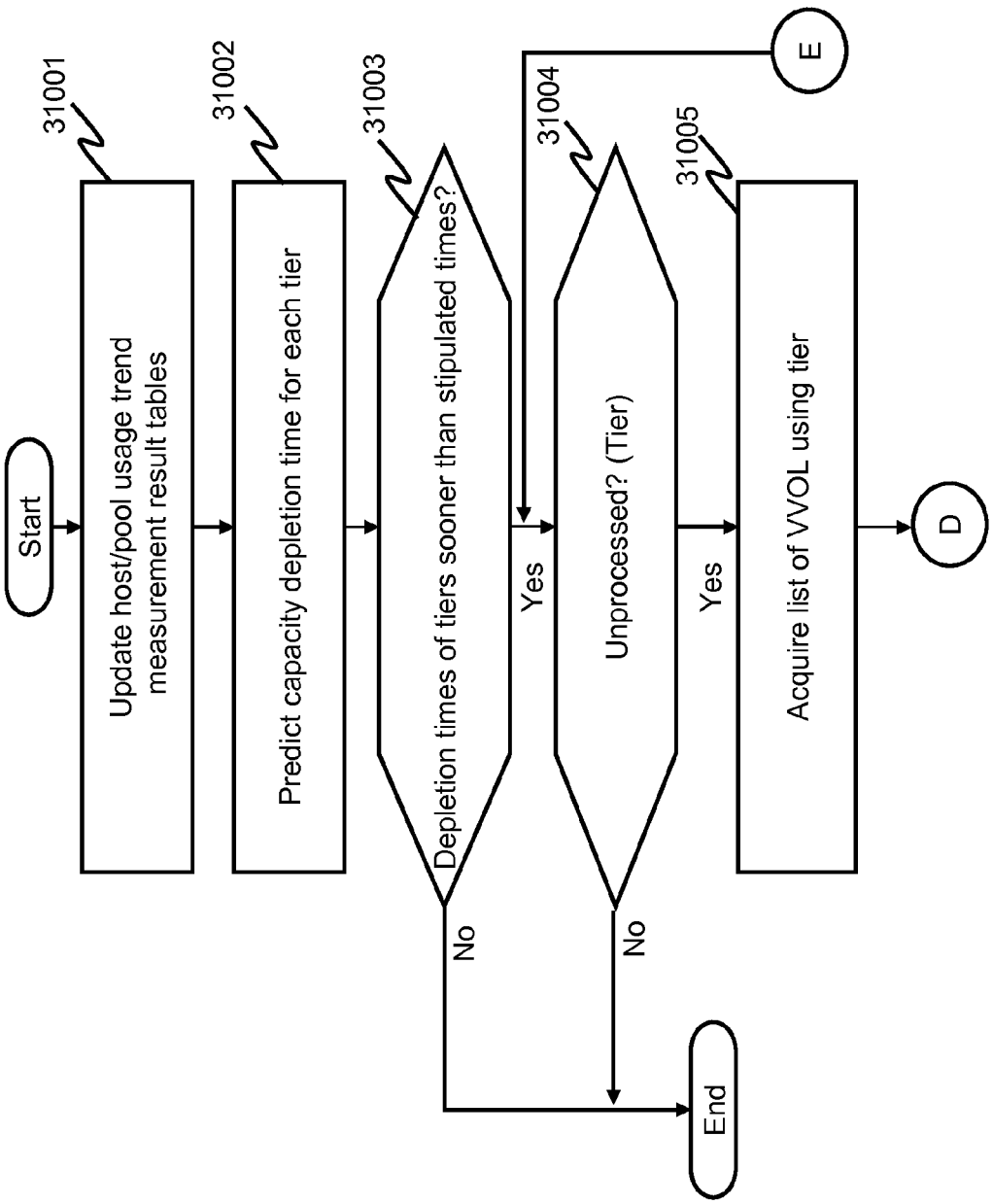
FIG. 31 is a portion of an example of a flowchart showing the flow of a tier depletion time prediction process related to a third example.
Figure 32:
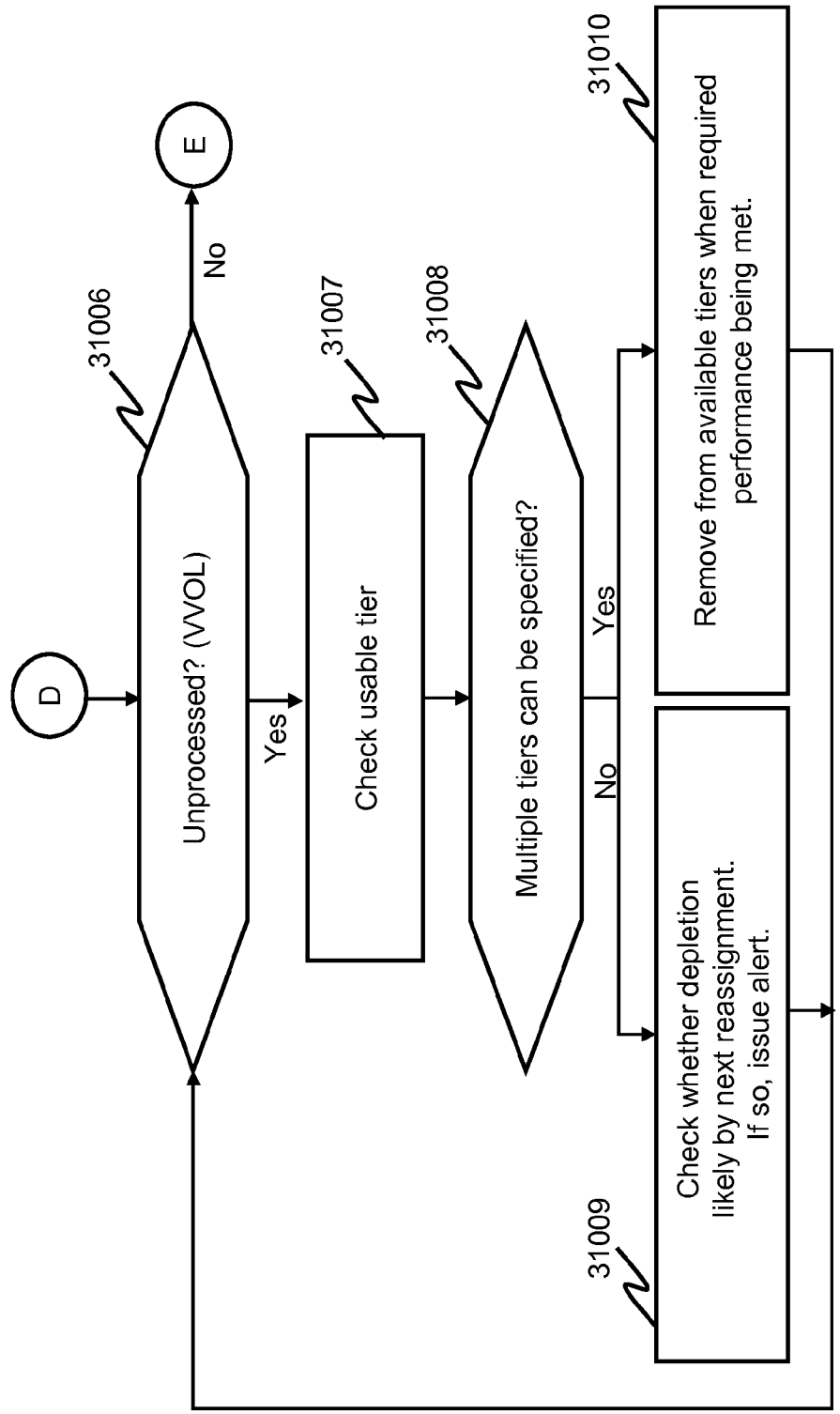
FIG. 32 is the remainder of the example of the flowchart showing the flow of the tier depletion time prediction process related to the third example.

FIGS. 31 and 32 are examples of flowcharts showing the flow of a tier depletion time prediction process related to the third example.

For example, the tier depletion time prediction process is carried out at the stage when the timing of the VVOL addition is known. Carrying out the tier depletion time prediction process at the stage when the timing of the VVOL addition is known makes it possible to ensure there are free pages in a tier that will be needed to meet the performance required for a VVOL. In the following explanation of the third example, the VVOL to be added will be called "new VVOL".

The tier depletion time prediction program 806 sends a request to the storage apparatus 203 to acquire host/pool usage trend measurement results. Thereafter, the prediction program 806 receives the information recorded in the host usage trend management table 306 and the pool usage trend management table 307 from the storage apparatus 203, and, based on this information, updates the host usage trend measurement result table 807 and the pool usage trend measurement result table 808 (S31001).

The prediction program 806, based on the pool usage trend measurement result table 808, the usage trend and/or the required performance of the new VVOL, and the time the new VVOL is to be added (the time the new VVOL is to be associated with the pool), checks the depletion time of each tier comprising the pool (S31002). Specifically, for example, the prediction program 806 computes for each tier the number of pages that are likely to be assigned anew to the existing VVOL up until the new VVOL is added, and the number of pages that are likely to be assigned to the new VVOL and the existing VVOL after the new VVOL is added, and finds the depletion time of each tier based on these numbers of pages computed for each tier.

The number of pages, which are predicted to be newly assigned to the new VVOL here, can also be predicted based on the usage trends of the host computer to which the new VVOL is to be provided. Also, the number of pages, which are predicted to be newly assigned to the new VVOL, can also be predicted based on the usage trends of another host computer for which the usage trends are similar to the host computer to which the new VVOL is to be provided. This information, for example, can be acquired from the usage trends of the host computer specified in the host specification 3307 of the VVOL creation/assignment interface 3301 (refer to FIG. 33), which will be described further below.

For example, the prediction program 806, based on the usage trends of the host computer to which the new VVOL is to be provided (or the usage trends of a host computer with usage trends that are similar to the usage trends of this host computer), can predict for each tier the number of pages to be assigned to the new VVOL from a first time to a second time.

The prediction program 806 determines whether or not the depletion time of each tier obtained in S31002 is sooner than the stipulated time (31003).

In a case where the result of the determination of S31003 is negative, the prediction program 806 ends the processing.

In a case where the result of the determination of S31003 is affirmative, the prediction program 806 determines whether or not there is a tier, among the tiers with depletion times that are sooner than the stipulated time, for which the processing of S31005 is not carried out (S31004).

In a case where the result of the determination of S31004 is negative, the prediction program 806 ends the processing.

In a case where the result of the determination of S31004 is affirmative, the prediction program 806 identifies a VVOL for which a tier with a depletion time that is sooner than the stipulated time is included in the available tier based on the VVOL management table 804 (S31005).

The prediction program 806 determines whether or not there is a VVOL (called the "target VVOL" in the explanation of FIGS. 31 and 32) among the VVOL acquired in S31005 for which the processing of S31007 is not carried out (S31006).

In a case where the result of the determination of S31006 is negative, the prediction program 806 executes S31004 once again.

In a case where the result of the determination of S31006 is affirmative, the prediction program 806 identifies the available tier of the target VVOL based on the VVOL management table 804 (S31007).

The prediction program 806, based on the available tier identified in S31007, determines whether or not multiple VVOLs are able to use multiple tiers (S31008).

In a case where the result of the determination of S31008 is negative, the prediction program 806 determines whether or not the tier(s) identified in S31008 will become depleted by the next page reassignment process based on the host usage trend management table 807, and in a case where depletion is likely, issues an alert and returns to the processing of S31006 (S31009).

In a case where the result of the determination of S31008 is affirmative, the prediction program 806 removes the tier that was processed in S31004 from the available tiers of the target VVOL (S31010). Specifically, for example, the prediction program 806 excludes the tier processed in S31004 from the tiers recorded in the available tier 906 of the VVOL management table 804.

Furthermore, the processing of S31010 can be divided into the following two steps:

(Step 1) Even though the prediction program 806 has removed the tier for which the depletion time is sooner than the stipulated time, notification of this fact is made to the user at the point in time when it has become clear that the required performance of all the VVOLs sharing the single pool will be met; and (Step 2) The user removes the tier for which the depletion time is sooner than the stipulated time when permitted.

The above steps make it possible not to assign a new page to an existing VVOL from a tier comprising pages that are to be assigned to a new VVOL while meeting the required performance of each VVOL. In accordance with this, the pages of a specific tier will not be depleted even though a new VVOL is added.

FIG. 33 shows an example of a VVOL creation/assignment interface.

The VVOL creation/assignment interface 3301 comprises an execution time specification 3302, a VVOL capacity specification 3303, an assignment-destination host specification 3304, a SLO specification 3305, a pool specification 3306, a host specification 3307, a host usage trend display 3308, and an OK button 3309.

The user can make the following specification via the VVOL creation/assignment interface 3301.

The time at which a new VVOL is to be added is specified in the execution time specification field 3302. The capacity of a new VVOL to be assigned to the host computer 101 is specified in the VVOL capacity specification field 3303. The ID of a host computer that is to become the provision destination of the new VVOL is specified in the host specification field 3304. The SLO of the new VVOL is specified in the SLO specification field 3305. The ID of the pool with which the new VVOL is to be associated is specified in the pool specification field 3306. Another host computer 101 with usage trends similar to the provision-destination host computer of the new VVOL is specified in the host specification field 3307. Furthermore, the usage trends of the host computer specified in the host specification field 3307 is shown for each tier in the usage trends display area 3308. In accordance with the OK button 3309 being pressed by the user, the storage apparatus 203 operates in a state in which the new VVOL has been added to the storage apparatus 203 at the time specified in the execution time specification field 3302.

Information based on the host usage trends measurement result table 807 is displayed in the host usage trends display area 3308 by the processor 212 of the management computer. Specifically, for example, the processor 212 identifies utilization history information of the host computer 101 specified in the host specification field 3307 from the usage trends measurement result table 807, and uses the identified utilization history information to display the host usage trends display 3308.

Furthermore, in this example, the pool with which the new VVOL is associated is specified by the user, but rather than a user specification, the pool with which the new VVOL is associated may be decided based on the result of the tier depletion time prediction process. Specifically, for example, in the determination of S31003, in a case where a pool has been found in which all of the tiers comprising the pool are tiers for which the depletion time is slower than the stipulated time and a prediction can be made that the capacity will probably not be depleted until the stipulated time even without changing the available tier of the existing VVOL, it can be assumed that this pool is the pool with which the new VVOL will be associated. That is, in the determination of S31003, in a case where a pool in which the depletion times of all of the tiers comprising the pool are slower than the stipulated times has been found, the processing of S31004 and beyond may be executed, and the available tier of the existing VVOL may be changed.

The records of the new used capacity (2605, 2705) may be recorded by being divided into new used capacity trends within a fixed period of time after the new VVOL was added, and new used capacity trends subsequent to the passage of a fixed period of time after the addition of the new VVOL. This is because new pages are assigned frequently when a new VVOL is added, but after a certain amount of time has elapsed the number of pages assigned anew are likely to decrease.

Also, in the history of the new used capacity (2605, 2705) for each time slot, rather than overwriting the previous measurement result with the current measurement result, an average value of the previous measurement result and the current measurement result may be recorded.

The new used capacity (2605, 2705) may also be recorded in units of applications rather than units of host computers 101.

A number of examples have been explained hereinabove, but the present invention is not limited to these examples. For example, the changing of the available tier can also be carried out in a case where a VVOL that has not met the required performance has been discovered (first example) and a case where there is a tier for which the depletion time is sooner than the stipulate time (second or third example).

REFERENCE SIGNS LIST

101 Host computer
103 Storage system
201 Management computer

203 Storage apparatus
251 Controller

DRAWINGS

[FIG. 1]
201 Management computer
109A SSD media group
109b SAS media group
109C SATA media group
[FIG. 2]
201 Management computer
211 Storage resource
101 Host computer
221 Storage resource
203 Storage apparatus
251 Controller
309A SSD group
309B SAS group
309C SATA group
[FIG. 3]
243 Memory
301 Pool management program
302 Page status management table
303 Pool management table
304 Media status management table
305 VOL management table
[FIG. 7]
706 Available tier
[FIG. 8]
211 Storage resource
801 VVOL configuration management program
802 VVOL performance management program
803 VVOL status monitoring program
804 VVOL management table
805 Tier definition table
[FIG. 9]
906 Available tier
910 Access distribution
[FIG. 11]
1101 VVOL assignment screen
1102 VVOL capacity
1103 Assignment-destination host
[FIG. 12]
12001 Measure performance of VVOL
12002 Performance>SLO×coefficient g?
12003 Output alert
[FIG. 13]
1301 VVOL list
1302 Warning: There is a VVOL that does not meet SLO
1303 Available tier
[FIG. 14]
1401 Warning
1405 Following VVOL do not meet required performance
1402 Available tier
[FIG. 15]
15001 Acquire current available tier for target VVOL
15002 Unprocessed? (Tier pattern)
15003 Measure performance of each VVOL
15004 Performance<=SLO×coefficient g for target VVOL?
15005 Performance<=SLO×coefficient g for each VVOL?
15006 Instruct that VVOL available tier be changed
15007 Output alert
[FIG. 16]
15008 Unprocessed? (VVOL)
15009 Unprocessed? (Tier pattern)
15010 Measure performance of each VVOL 15011 Performance<=SLO×coefficient g for affected VVOL?
15012 Performance<=SLO×coefficient g for each VVOL?
15013 Instruct that VVOL available tier be changed
15014 Output alert
15015 Performance=SLO×coefficient g for affected VVOL that has been processed?
[FIG. 17]
1702 Access distribution
1704 Media ratios
1707 Pre-change tier
1708 Post-change tier
[FIG. 18]
1801 Warning
1802 Following VVOL will cease to satisfy required performance when performance of VVOL 2 @ SUB1 is enhanced. Therefore, recommend adding media.
1804 Current performance
1805 Post-change performance
1806 Continue
1807 Cancel
[FIG. 19]
243 Memory
301 Pool management program
302 Page status management table
303 Pool management table
304 Media status management table
305 VOL management table
306 Host usage trend management table
307 Pool usage trend management table
[FIG. 20]
706 Available tier
707 Candidate tier
[FIG. 21]
2106 Time
2107 New used capacity
2108 Used capacity during measurement
[FIG. 22]
2203 Time
2204 New used capacity
2205 Used capacity during measurement
2206 Free capacity
[FIG. 23]
211 Storage resource
801 VVOL configuration management program
802 VVOL performance management program
803 VVOL status monitoring program
806 Tier depletion time prediction program
804 VVOL management table
805 Tier definition table
807 Host usage trend measurement result table
808 Pool usage trend measurement result table
[FIG. 24]
906 Pre-change tier
907 Post-change tier
[FIG. 25]
910 Access distribution
[FIG. 26]
2604 Time
2605 New used capacity
[FIG. 27]
2704 Time
2705 New used capacity
2706 Free capacity
[FIG. 28]
28001 Update host/pool usage trend measurement result tables 28002 Predict capacity depletion time for each tier
28003 Depletion times of tiers faster than stipulated times?
28004 Unprocessed? (Tier)
28005 Acquire list of VVOL using tier
[FIG. 29]
28006 Unprocessed? (VVOL)
28007 Check usable tier
28008 Multiple tiers can be specified?
28009 Check whether depletion likely by next reassignment. If so, issue alert.
28010 Remove from available tiers when required performance being met.
[FIG. 30]
3001 Actual and predicted use of pool 1 @ storage system 1
3002 Warning: Page assignment from Tier 1 will no longer be possible as of 12/2 23:00 if tier continues to be used under current circumstances.
3003
Free capacity
Assigned pages (GB)
Depletion time (12/3 23:00)
12/2 00:00 (present time)
Actual use
Predicted use
Time
3004
Free capacity
Assigned pages (GB)
12/2 00:00 (present time)
Actual use
Predicted use
Time
[FIG. 31]
31001 Update host/pool usage trend measurement result tables
31002 Predict capacity depletion time for each tier
31003 Depletion times of tiers faster than stipulated times?
31004 Unprocessed? (Tier)
31005 Acquire list of VVOL using tier
[FIG. 32]
31006 Unprocessed? (VVOL)
31007 Check usable tier
31008 Multiple tiers can be specified?
31009 Check whether depletion likely by next reassignment. If so, issue alert.
31010 Remove from available tiers when required performance being met.
[FIG. 33]
3301 VVOL assignment screen
3302 Execution time
3303 VVOL capacity
3304 Assignment-destination host
3306 Pool/Pool 1
Host having new usage trend similar to assignment-destination host
3308 Host 2 usage trend
Assigned pages (GB)
Time
Day 0
Day 1
Day 3
Assigned pages (GB)
Time
Day 0
Day 1
Day 2

The invention claimed is:

1. A management computer coupled to a host computer and a storage system,
wherein the storage system comprises:
a plurality of storage media which differ from each other in I/O performance and are categorized into a plurality of tiers by I/O performance;
configuration management information which includes an identifier (ID) of a virtual volume, an ID of a pool, an ID of a storage medium of the plurality of storage media, an ID of a page, an ID of an available tier, and an I/O performance; and
tier management information which includes the ID of the storage medium, an ID of a tier of the plurality of tiers, and a limit of I/O performance; and
is configured to:
make the pool from the plurality of storage media;
associate the virtual volume with the pool;
provide the virtual volume to the host computer; and
reassign data among the plurality of tiers by the page by referring to the configuration management information and the tier management information to make the I/O performance of reassigned data meet a required I/O performance,
wherein the management computer comprises virtual volume management information which includes the ID of the virtual volume, the required I/O performance, and the ID of the available tier, and
is configured to:
when there is a first specified virtual volume which does not meet the required I/O performance and is a target for resetting, change the available tier of the first specified virtual volume to meet the required I/O performance;
check whether there is another virtual volume which does not meet the required I/O performance in consequence of the change of the first specified virtual volume; and
when there is another virtual volume which does not meet the required I/O performance, change the available tier of the another virtual volume to meet the required I/O performance.

2. The management computer according to claim 1, wherein a decreasing number of the tier by the change is a minimum number to meet the required I/O performance.

3. The management computer according to claim 2, wherein the check is executed by predicting I/O performance of the first virtual volume on the assumption that a first specified tier is removed from the available tier of the first virtual volume and the reassignment is executed.

4. The management computer according to claim 3, wherein the check is executed by comparing the predicted I/O performance relating to the first specified tier with the required I/O performance.

5. The management computer according to claim 4, wherein changing the available tier comprises removing the first specified tier from the available tier of the first virtual volume when the comparing indicates the predicted I/O performance relating to the first specified tier is less than the required I/O performance.

6. The management computer according to claim 5, wherein the check is executed by predicting I/O performance of a second specified virtual volume associated with the pool associated with the first specified virtual volume on the assumption that a second specified tier is removed from the available tier of the second specified virtual volume and the reassignment is executed when the comparing indicates the predicted I/O performance relating to the first specified tier is more than the required I/O performance.

7. The management computer according to claim 6,
wherein the check is executed by comparing the predicted I/O performance relating to the second specified tier with the required I/O performance.

8. The management computer according to claim 7,
wherein changing the available tier furthermore comprises removing the second specified tier from the available tier of the second specified virtual volume when the comparing indicates the predicted I/O performance relating to the second specified tier is less than the required I/O performance.

9. The management computer according to claim 8,
wherein the check relating to the second virtual volume is executed for all virtual volumes associated with the pool associated with the first specified virtual volume, excluding the first specified virtual volume.

10. The management computer according to claim 9,
further configured to output an alert when the comparing indicates the predicted I/O performance relating to the virtual volumes associated with the pool associated with the first specified virtual volume is more than the required I/O performance.

11. A method for managing a storage system coupled to a host computer and a management computer,
wherein the storage system comprises:
a plurality of storage media which differ from each other in I/O performance and are categorized into a plurality of tiers by I/O performance;
configuration management information which includes an identifier (ID) of a virtual volume, an ID of a pool, an ID of a storage medium of the plurality of storage media, an ID of a page, an ID of an available tier, and an I/O performance; and
tier management information which includes the ID of the storage medium, an ID of a tier and a limit of I/O performance, and
wherein the management computer comprises virtual volume management information which includes the ID of the virtual volume, a required I/O performance, and the ID of the available tier,
the method comprising the steps of:
making the pool from the plurality of storage media;
associating the virtual volume with the pool;
providing the virtual volume to the host computer;
reassigning data among the plurality of tiers by the page by referring to the configuration management information and the tier management information to make the I/O performance of reassigned data meet the required I/O performance;
when there is a first specified virtual volume which does not meet the required I/O performance, changing the available tier of the first specified virtual volume to meet the required I/O performance;
checking whether there is another virtual volume which does not meet the required I/O performance in consequence of the change of the first specified virtual volume; and
when there is another virtual volume which does not meet the required I/O performance, changing the available tier of the another virtual volume to meet the required I/O performance.

12. The method according to claim 11,
wherein a decreasing number of the tier by the changing is a minimum number to meet the required I/O performance.

13. The method according to claim 12,
wherein the step of checking is executed by predicting I/O performance of the first virtual volume on the assumption that a first specified tier is removed from the available tier of the first virtual volume and the step of reassigning is executed.

14. The method according to claim 13,
wherein the step of checking is executed by comparing the predicted I/O performance relating to the first specified tier with the required I/O performance.

15. The method according to claim 14,
wherein the step of changing the available tier comprises removing the first specified tier from the available tier of the first virtual volume when the comparing indicates the predicted I/O performance relating to the first specified tier is less than the required I/O performance.

16. The method according to claim 15,
wherein the step of checking is executed by predicting I/O performance of a second specified virtual volume associated with the pool associated with the first specified virtual volume on the assumption that a second specified tier is removed from the available tier of the second specified virtual volume and the step of reassigning is executed when the comparing indicates the predicted I/O performance relating to the first specified tier is more than the required I/O performance.

17. The method according to claim 16,
wherein the step of the checking is executed by comparing the predicted I/O performance relating to the second specified tier with the required I/O performance.

18. The method according to claim 17,
wherein the step of changing the available tier comprises removing the second specified tier from the available tier of the second specified virtual volume when the comparing indicates the predicted I/O performance relating to the second specified tier is less than the required I/O performance.

19. The method according to claim 18,
wherein the step of checking relating to the second virtual volume is executed for all virtual volumes associated with the pool associated with the first specified virtual volume, excluding the first specified virtual volume.

20. The method according to claim 19,
furthermore comprising a step of outputting an alert when the comparing indicates the predicted I/O performance relating to the virtual volumes associated with the pool associated with the first specified virtual volume is more than the required I/O performance.

* * * * *